(12) United States Patent
Waragai et al.

(10) Patent No.: US 8,233,720 B2
(45) Date of Patent: Jul. 31, 2012

(54) OBJECT DETECTING APPARATUS AND LEARNING APPARATUS FOR THE SAME

(75) Inventors: Katsunori Waragai, Kanagawa (JP); Fumi Kawai, Tokyo (JP); Heng Cher Keng, Singapore (SG)

(73) Assignee: Panasonic Corporation, Osaka (JP)

( * ) Notice: Subject to any disclaimer, the term of this patent is extended or adjusted under 35 U.S.C. 154(b) by 1227 days.

(21) Appl. No.: 11/917,067

(22) PCT Filed: Jun. 14, 2006

(86) PCT No.: PCT/JP2006/311953
§ 371 (c)(1), (2), (4) Date: Dec. 10, 2007

(87) PCT Pub. No.: WO2006/134981
PCT Pub. Date: Dec. 21, 2006

(65) Prior Publication Data
US 2009/0232403 A1    Sep. 17, 2009

(30) Foreign Application Priority Data

Jun. 15, 2005 (JP) .................................. 2005-175356

(51) Int. Cl.
  *G06K 9/00* (2006.01)
  *G06K 9/36* (2006.01)
  *G06K 9/56* (2006.01)
(52) U.S. Cl. .......................... 382/205; 382/103; 382/291
(58) Field of Classification Search .................. 382/118, 382/165, 170, 195, 205, 103, 291
See application file for complete search history.

(56) References Cited

U.S. PATENT DOCUMENTS

| | | | | |
|---|---|---|---|---|
| 5,293,427 | A  * | 3/1994  | Ueno et al. | 382/103 |
| 7,212,651 | B2   | 5/2007  | Viola et al. | |
| 7,263,229 | B2 * | 8/2007  | Wang et al. | 382/199 |
| 7,330,592 | B2 * | 2/2008  | Wang et al. | 382/199 |
| 7,333,673 | B2 * | 2/2008  | Wang | 382/269 |
| 7,379,568 | B2 * | 5/2008  | Movellan et al. | 382/118 |
| 7,574,037 | B2 * | 8/2009  | Hidai et al. | 382/159 |
| 7,587,069 | B2 * | 9/2009  | Movellan et al. | 382/118 |
| 7,624,076 | B2 * | 11/2009 | Movellan et al. | 706/12 |
| 7,630,525 | B2 * | 12/2009 | Sabe et al. | 382/118 |

(Continued)

FOREIGN PATENT DOCUMENTS
EP    0359301 A1    3/1990

(Continued)

OTHER PUBLICATIONS

International Search Report Dated Jul. 25, 2006.

(Continued)

*Primary Examiner* — Aaron W Carter
(74) *Attorney, Agent, or Firm* — Pearne & Gordon LLP

(57) ABSTRACT

An object detecting apparatus capable of suppressing an increase of processing loads with high accuracy and a learning apparatus for the same are provided. An object detecting apparatus includes an image window extracting portion (210) for extracting an image window as a partial area of an image in plural from an input image, and a network identifier (590) for detecting a presence of an object from extracted image windows respectively by using a node network in which nodes each having an identifier for identifying the object stored in a storing portion (502) are connected as a network.

7 Claims, 13 Drawing Sheets

U.S. PATENT DOCUMENTS

| | | | |
|---|---|---|---|
| 7,657,085 B2* | 2/2010 | Sabe et al. | 382/159 |
| 7,783,086 B2* | 8/2010 | Sabe et al. | 382/118 |
| 2002/0102024 A1 | 8/2002 | Jones et al. | |
| 2005/0094877 A1* | 5/2005 | Wang et al. | 382/199 |
| 2005/0094890 A1* | 5/2005 | Wang | 382/266 |
| 2005/0102246 A1 | 5/2005 | Movellan et al. | |
| 2005/0163380 A1* | 7/2005 | Wang et al. | 382/199 |
| 2005/0213810 A1* | 9/2005 | Sabe et al. | 382/159 |
| 2005/0220336 A1* | 10/2005 | Sabe et al. | 382/159 |
| 2005/0280809 A1* | 12/2005 | Hidai et al. | 356/237.3 |
| 2008/0235165 A1* | 9/2008 | Movellan et al. | 706/12 |
| 2008/0247598 A1* | 10/2008 | Movellan et al. | 382/100 |
| 2009/0175533 A1* | 7/2009 | Sabe et al. | 382/159 |

FOREIGN PATENT DOCUMENTS

| | | |
|---|---|---|
| EP | 0463242 A1 | 1/1992 |
| JP | 09-91432 A | 4/1997 |
| JP | 2000-194856 A | 7/2000 |
| JP | 2005-044330 | 2/2005 |
| WO | 2004/114219 A1 | 12/2004 |

OTHER PUBLICATIONS

Yoav Freund et al.; "A decision-theoretic generalization of on-line learning and an application to boosting"; Proceedings of the Second European Conference on Computational Learning theory; Barcelona Mar. 1995.

Bernhard Froba et al.; "Face Detection with the Modified Census Transform"; Proceedings of the Sixth IEEE International Conference on Automatic Face and Gesture Recognition; 2004.

Henry A. Rowley et al.; "Neutral Network-Based Face Detection"; IEEE Transactions on pattern analysis and machine intelligence; vol. 20; No. 1; Jan. 1998.

Paul Viola et al.; "Rapid object detection using a boosted cascade of simple features"; IEEE; 2001.

Frohba and A Ernst B, "Fast Frontal-View Face Detection Using a Multi-path Decision Tree", Lnaiadvances in Artificial Intelligence, Iberamia 2004, Springer, DE, vol. 2688, Jan. 1, 2003, pp. 921-928, XP002416172, ISBN: 978-3-540-24128-7.

Li, S, "Statistical Learning of Multi-View Face Detection", Lnaiadvances in Artificial Intelligence, Iberamia 2004, Springer, DE, vol. 2353, May 27, 2002, pp. 67-81, XP002367708, ISBN: 978-3-540-24128-7.

Duda, Richard O et al., "Pattern Classification", Chapter 9, Algorithm-Independent Machine Learning, 2001, XP002423572.

Rong Jin, et al., "A New Boosting Algorithm Using Input-Dependent Regularizer", Proceedings of the 20th International Conf. on Machine Learning (ICML '03), Aug. 21, 2003 to Aug. 24, 2003, XP55001212.

Supplementary European Search Report for PCT/JP2006311953 dated Jul. 13, 2011.

Yang, Ming-Hsuan, et al., "Face Detection and Gesture Recognition for Human-Computer Interaction", Jan. 1, 2001, Kluwer International Series in Video Video Computing, Norwell, MA: Kluwer Academic Publ, US, pp. 12-15, XP002515577, ISBN: 978-0-7923-7409-1.

Yang, Ming-Hsuan, et al., "Face Detection and Gesture Recognition for Human-Computer Interaction, Detecting Faces in Still Images", Jan. 1, 2001, Kluwer International Series in Video Video Computing, Norwell, MA: Kluwer Academic Publ, US, pp. 23-26, XP002597039, ISBN: 978-0-7923-7409-1.

Zabith R, et al., "Non-parametric local transforms for computing visual correspondence" Lnaiadvances in Artificial Intelligence, Iberamia 2004, Springer DE, vol. 801, May 2, 1994, pp. 151-158, DOI: DOI:10.1007/BFB0028345, XP002097628, ISBN: 978-3-540-24128-7.

Fabrizio Smeraldi, "A Nonparametric Approach to Face Detection Using Ranklets" in: "Audio- and Video-Based Biometric Person Authentication", Jan. 1, 2003, Springer Berlin Heidelberg, Berlin, Heidelberg, XP55001064, ISBN: 978-3-54-040302-9, pp. 351-359.

Fabrizio Smeraldi, "Ranklets: orientation selective non-parametric features applied to face detection", Pattern Recognition, 2002. Proceedings. 16TH International Conference on Quebec City, QUE., Canada Aug. 11-15, 2002, Los Alamitos, CA, USA, IEEE Comput. Soc, US vol. 3, Aug. 11, 2002, pp. 379-382, XP010613643, DOI: DOI: 10.1109/ICPR.2002.1047924 ISBN: 978-0-7695-1695-0.

Shengcai Liao, et al., "Learning Multi-scale 1-7 Block Local Binary Patterns for Face Recognition", Aug. 27, 2007, Advances in Biometrics; [Lecture Notices in Computer Science], Springer Berlin Heidelberg, Berlin, Heidelberg, pp. 828-837, XP019098965, ISBN: 978-3-540-74548-8.

Lun Zhang, et al., Face Detection Based on Multi-Block LBP Representation, Aug. 27, 2007, Advances in Biometrics; [Lecture Notices in Computer Science], Springer Berlin Heidelberg, Berlin, Heidelberg, pp. 11-18, XP019098891, ISBN: 978-3-540-74548-8.

Jifeng Shen, et al., "A Novel Distribution-Based Features for Face Detection", Pattern Recogntion (CCPR), 2010 Chinese Conference on, IEEE, Piscataway, NJ, USA, Oct. 21, 2010, pp. 1-5, XP031819250,. ISBN: 978-1-4244-7209-3.

Mita T, et al., "Joint Haar-like Features for Face Detection", Computer Vision, 2005, ICCV 2005. Tenth IEEE International Conference on Beijing, China Oct. 17-20, 2005, Piscataway, NJ, USA, IEEE, Los Alamitos, CA, USA, vol. 2, Oct. 17, 2005, pp. 1619-1626, XP010857007, DOI: DOI:10.1109/ICCV.2005.129 ISBN: 978-0-7695-2334-7.

Supplementary European Search Report for Application No/Patent No. 11150987.3-1224 dated Jul. 13, 2011.

\* cited by examiner

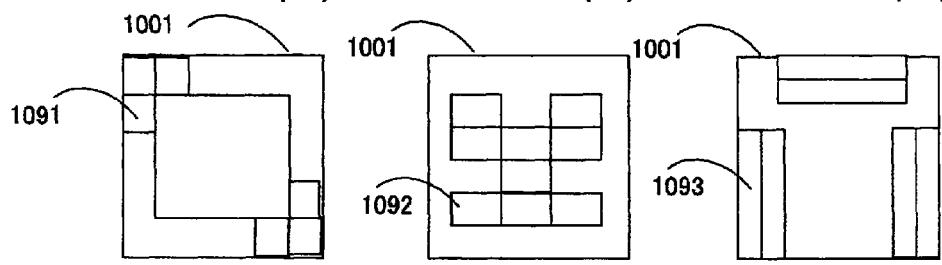
FIG. 14(A)  FIG. 14(B)  FIG. 14(C)
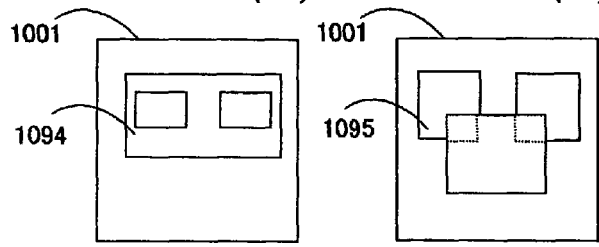
FIG. 14(D)  FIG. 14(E)
PRIOR ART  FIG. 15(A)    FIG. 15(B)  PRIOR ART
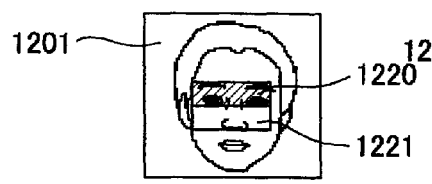 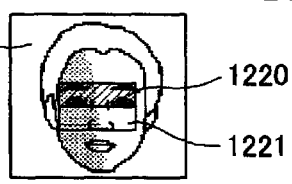
PRIOR ART  FIG. 15(C)    FIG. 15(D)  PRIOR ART
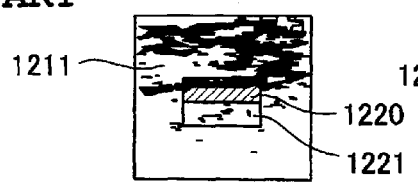 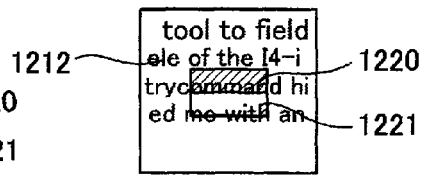

OBJECT DETECTING APPARATUS AND LEARNING APPARATUS FOR THE SAME

TECHNICAL FIELD

The present invention relates to an object detecting apparatus for detecting an object such as a face, or the like from an image, and a learning apparatus for the same.

BACKGROUND ART

In the computer vision, the object detecting technology is concluded as a subject that is applied to decide whether or not a particular object is caught in an image. As the object, there are car, walker, human face, and the like. In many applications, the object detection is appreciated as the very difficult problem. For example, in case the object is the human face, how the face is seen is changed largely depending on the direction of face, the illumination, and the partial occlusion by sunglasses, mask, or the like. Also, when a picture quality is wrong and noises are superposed on the image or when the face picked up in the image is small, it is more difficult to detect the face in the application used in the surveillance system, or the like.

As the common system for solving the problem in the object detection, there is the pattern recognizing technology based on the statistical learning. The parameter for an identifier is decided on the basis of a learning sample given previously. As the common approach in the face detection, there are approaches using neural network, support vector machine, Bayes estimation, and the like. Normally these approaches are constructed based on the feature selecting technology to extract a feature quantity used in identification from the input image, the identifier building technology to build the identifier used to decide whether or not the object is present, based on an input of the selected feature quantity, and the technology to decide whether or not a face is present in the image window, by using the built identifier. Here, the "image window" means a partial area in the input image. A large number of windows in which a position or a size of the partial area is changed can be cut out from the input image.

As the identifier building approach, there is Adaptive Boosting or Adaboost known in Non-Patent Literature 1. This approach is called as the "Adaboost learning method" hereinafter. This approach is applied to a number of object detecting apparatuses, and the approach of detecting a face from an image using this approach is set forth in Non-Patent Literature 2. In the Adaboost learning method, the identifier may have a high error rate such that a discrimination error may be set to 50% or less, and this identifier is called a weak classifier. In the Adaboost learning method, a strong classifier whose error rate is low is built up by choosing some weak classifiers among a large number of prepared weak classifiers and then assembling these weak classifiers.

As the approach of detecting the frontal face in real time by using the Adaboost learning method, there are the approaches set forth in Non-Patent Literature 2 and Patent Literature 1. In the face identifier, i.e., the face sensor set forth in Non-Patent Literature 2 and Patent Literature 1, a cascade structure in which a plurality of strong classifiers are coupled in series is employed. In the cascade structure, the coupled discriminator is called the stage and the first stage positioned closest to the input side is called a first-stage strong classifier or a stage identifier at the first stage. The identifier at each stage is build up by executing the learning based on the Adaboost learning method and then coupling a large number of weak classifiers based on the feature quantity extracted from the input image for the purpose of learning. The identifier at each stage is trained for the learning sample of the face image such that they can be identified correctly at almost 100%, but trained for the learning sample of the non-face image such that they can be identified correctly at almost 50%. The stage identifier at the first stage decides whether not the input image corresponds to the face or not, and the stage identifiers at the first stage et seq. decide respectively whether not the input image being decided as the face by the stage identifier at the first stage corresponds to the face or not. Since the input image being decided as the non-face by the stage identifier at the n-th stage is not processed much more and the decision is made as the non-face, the processing can be done effectively. Thus, it is known that the above approach can be operated at a processing speed of about 15 frames per second.

Also, there is the approach of improving an identification accuracy by building up a plurality of face sensors by using different learning samples and integrating these identified results. As an example of this approach, the Majority Voting system is shown in Non-Patent Literature 2. The authors Viola, et al. of Non-Patent Literature 2 indicates that three cascaded identifies (identifier having the cascade structure) are prepared and an identification error is reduced by the majority voting of these output results. In another application shown in Non-Patent Literature 3, the authors Rowley, et al. of Non-Patent Literature 3 trained a number of neural networks to build up the face sensor. As the method of coupling the results of a plurality of sensors, the approach of using the neural network that is trained to output the final result from a large number of neural network sensors has been proposed instead of the majority voting system.

As the method of extracting the feature quantity to sense the face, the feature called a rectangle feature has been proposed by Viola, et al in Non-Patent Literature 2. The rectangle feature of the image window is extracted by measuring a brightness difference between rectangular partial areas defined by a rectangular filter respectively.

Also, as another feature quantity extracting method, "Modified Census Transform" in Non-Patent Literature 4 has been proposed. The feature quantity is extracted by converting a 3×3 pixel block in the input image into a binary image. A brightness value of the pixel in the block is compared with a brightness average value in the block. A value 1 is labeled if the brightness value of the pixel is higher than the average value whereas a value 0 is labeled if not so. Thus, 9-bit information is obtained by arranging sequentially labels of all pixels in the block, and this information is used as a value of the feature quantity.

Patent Literature 1: US Patent Application Publication 2002/0102024 Specification Non-Patent Literature 1: Yoav Freund, Robert E. Schapire, "A decision-theoretic generalization of on-line learning and an application to boosting", Computational Learning Theory: Eurocolt '95, Springer-Verlag, 1995, p. 23-37

Non-Patent Literature 2: Paul Viola, Michael Jones, "Rapid Object Detection Using a Boosted Cascade of Simple Features", IEEE Computer Society Conference on Computer Vision and Pattern Recognition (CVPR), 2001 December, ISSN: 1063-6919, Vol. 1, p. 511-518

Non-Patent Literature 3: H. Rowley, S. Baluja, T. Kanade, "Neural Network-Based Face Detection", IEEE Transactions on Pattern Analysis and Machine Intelligence (PAMI), Vol. 20, No. 1, 1998 January, p. 23-28

Non-Patent Literature 4: Bernhard Froba, Andreas Ernst, "Face Detection with the Modified Census Transform", Pro-

DISCLOSURE OF THE INVENTION

Problems that the Invention is to Solve

However, there are problems about the above detecting technologies.

The first problem is that, in the cascade identifier proposed in Non-Patent Literature 2 and Patent Literature 1, the weak classifier is constructed by a linear identifier that processes a whole input space. The weak classifier is added/trained to compensate an identification error of the preceding weak classifier. In this case, when the trained weak classifier is added newly, an error of the overall identifier constructed by coupling these weak classifiers can be gradually decreased and the error can be improved in a certain partial area of the input space, nevertheless the identification error is caused in another partial area. Therefore, when the image feature resembles closely between the image containing the object (e.g., face) and the image not containing the object, often the strong classifier at the later stage of the cascade identifier cannot separate linearly these data on the feature interval and thus an occurring rate of the discrimination error is increased. As a result, a huge number of weak classifiers are needed, and the number of discriminations processed at a time of identification is increased.

Also, in learning the stage identifier, the image not containing the object (referred to as a "non-object image" hereinafter) is learned by the different image sample every stage, and then the best (most discriminable) weak classifier suited for the non-object image in learning is selected. In contrast, the image containing the object (referred to as an "object image" hereinafter) must be recognized as the object itself at all stages, and is learned by the same image sample. However, for example, when the object is the face, the feature of the face image is largely different depending on direction/inclination of the face, illumination conditions, personal features, human race, concealment by sunglasses, mask, hair, and the like. The face that faces forward and has clear eyes, nose, mouth, etc. in the image is ready to discriminate, while the face is hard to discriminate when the feature of the face is reduced by direction, illumination, etc. Despite of such circumstances, the identifier in the prior art is processing these face features by using the same weak classifier. There is no mechanism for processing the face image that is easy to be distinguished from the non-face. Also, since the identification responding to the feature of each face cannot be realized, it is difficult to sense the complicated face feature with high accuracy.

The second problem is that, in the cascade structure in Non-Patent Literature 2 and Patent Literature 1, no information is transferred from the strong classifier at a certain stage to the strong classifier at another stage. In the system in the prior art, the weak classifier at a certain stage does not know an output value of the strong classifier at the preceding stage. Therefore, when the object is the face image, for example, the building of the sensor for sensing the face that faces forward and is ready to discriminate as the object can be realized by the cascade structure, but it is difficult for the cascade structure to realize the sensor sensing the complicated face (e.g., face images faced in various directions), whose input space is complicated and whose identifier extends to a high order, as the object. When the strong classifier executes the learning not to know the result of the strong classifier at the preceding stage, the weak classifier used in that strong classifier is selected from the weak classifiers that separate the learning face/non-face samples most satisfactorily as a whole. In contrast, if information concerning whether it is hard for the strong classifier at the preceding stage to discriminate the sample (i.e., whether or not the sample resides around the boundary between the face and the non-face) or it is easy for the same to discriminate the sample is given as the result of the strong classifier at the preceding stage, the weak classifier for identifying satisfactorily the sample around the boundary between the face and the non-face can be incorporated by using such information. Thus, it is possible to find out quickly the boundary between the face and the non-face on a feature space. As a result, it is considered that the information of the strong classifier at the preceding stage is indispensable in realizing the building of the sensor that can identify the complicated face such as the faces directed in various directions, which has the complicated identification boundary, or the like.

The third problem is that, in the majority voting system set forth in Non-Patent Literature 2, a processing load is heavy because a plurality of sensors operate in parallel. Also, since the cascaded identifies are trained individually respectively, it is not clear whether or not these identifies are operating complementarily. Also, no information is shared among the identifiers. The majority voting approach is not the best approach applied to couple the results of a plurality of sensors. For example, when the totally different identifiers are trained and a plurality of identifiers are built up to output the best result as recited in Non-Patent Literature 4, a processing time becomes shorter.

The fourth problem is that, in Non-Patent Literature 2 and Patent Literature 1, the rectangle feature based on the brightness value and proposed by Viola, et al. is sensitive to the illumination environment. For example, FIG. 15 is a view explaining the problem of the rectangle feature in the prior art, and the rectangle feature is a value of the brightness difference between a rectangle 1220 shaded by an oblique line in FIG. 15 and a rectangle 1221. For example, the influence of illumination appears strongly on a part of the face in a face image 1202 in FIG. 15(B), and a difference of the brightness value in such image has the similar value to that of a non-face image 1212 in FIG. 15(D). Also, because only the brightness information in the rectangular block is measured as the feature quantity, important arrangement information cannot be acquired from the feature quantity. For example, because both a non-face image 1211 in FIG. 15(C) and a face image 1201 in FIG. 15(A) have equal numbers of pixels each having the low brightness value, they have the value of the brightness difference in the same extent. A spatial distribution of the pixels having the high/low brightness values is very important in identifying the image, nevertheless such distribution is not considered during the feature extraction. In the identifiers at the later stage in which the non-face image and the face image closely resemble each other, the rectangle feature becomes less effective in separating the face and the non-face and thus the identification error is increased. This event acts as the factor that increases largely the number of feature quantities in the stage identifier.

As the different approach, there is the "modified census transform" feature quantity based on the pattern, as recited in Non-Patent Literature 4, for example. However, since this approach extracts only a local feature quantity, such approach becomes sensitive to the influence of the noise. For example, FIG. 16 is a view explaining the problem of a feature quantity in the prior art. A conversion template picks up the feature quantity from a 3×3 pixel block 1250. When the block 1250 is converted into the binary value as shown in a binary block

1251, a non-face image 1231 on which the noises are superposed is converted into the same binary block value as the face image 1201. This is because the brightness information is completely neglected from the "modified census transform" feature quantity. Since the "modified census transform" feature quantity uses the pixel as a unit, the pixel block is excessively localized and the feature quantity cannot be acquired on the whole situation.

The present invention has been made in view of the above circumstances, and it is an object of the present invention to provide an object detecting apparatus capable of suppressing an increase of processing loads with high accuracy, and a learning apparatus for the same.

Means for Solving the Problems

First, an object detecting apparatus of the present invention, includes an image window extracting portion for extracting a plurality of image windows as partial areas of an image from an input image; and an object detecting portion for detecting a presence of an object from the extracted image windows respectively by using a node network in which nodes each having an identifier for identifying the object are connected as a network.

According to this configuration, the presence of the object is detected by identifying the image window by using the node network. Therefore, an increase of processing loads can be suppressed with high accuracy.

Second, in the object detecting apparatus according to the first of the present invention, the nodes have a plurality of identifiers.

Third, in the object detecting apparatus according to the first or the second of the present invention, the object detecting portion has a route generating portion for generating at least one path in the node network, and an identifying portion for performing an identifying process of the object in each of the generated paths, and outputting an identified result to indicate whether or not the image window contains the object.

Fourth, in the object detecting apparatus according to the third of the present invention, the object detecting portion decides whether or not a new route not evaluated yet is present in the node network in the image window, and repeats a route generating process of the route generating portion and an identified result outputting process of the identifying portion based on a decision result.

Fifth, in the object detecting apparatus according to the fourth of the present invention, the route generating process and the identified result outputting process are repeated until a number of repetition reaches a predetermined number of times or a new route is not generated.

Sixth, in the object detecting apparatus according to any one of the third to the fifth of the present invention, the route generating portion has a route deciding portion for deciding at least one route such that a number of routes does not exceed a predetermined number, and a function of splitting each route on the network to generate a new route.

Seventh, in the object detecting apparatus according to any one of the third to the sixth of the present invention, the identifying portion has an evaluating portion for performing an identifying process to obtain an identified result and an identification error in each generated route, a selecting portion for selecting the identified result in the route having a lowest identification error as the identified result of the node network, and a stop deciding portion for deciding that the identifying process in the evaluating portion is stopped when the lowest identification error becomes smaller than a predetermined value.

Eighth, in the object detecting apparatus according to the seventh of the present invention, the evaluating portion has an extracting portion for extracting a feature quantity value of the image window at respective nodes of the generated route, an applying portion for applying the feature quantity value to the identifier to derive an evaluation value of respective nodes of the generated route, a joining portion for joining evaluation values of respective nodes to generate an accumulated evaluation value of the generated route, an identifying portion for identifying whether or not the image window contains an objective substance, by using the accumulated evaluation value to obtain the identified result of the generated route, and an error estimating portion for estimating the identification error with respect to the identified result of the generated route.

Ninth, in the object detecting apparatus according to any one of the first to the eighth of the present invention, whether or not the identified results obtained by the identifiers at respective nodes are utilized in a decision of a final result is changed in response to a feature in the image window.

Tenth, in the object detecting apparatus according to any one of the first to the eighth of the present invention, a rate at which the identified results obtained by the identifiers at respective nodes is utilized in a decision of a final result is changed in response to a feature in the image window.

Eleventh, in the object detecting apparatus according to the tenth of the present invention, a rate at which the identified results obtained by the identifiers at respective nodes is utilized in the decision of the final result is decided based on a difference between the feature in the image window and a feature of an image used in learning of the identifiers.

Twelfth, in the object detecting apparatus according to any one of the first to the eighth of the present invention, when the identifiers are based on a boosting method, a rate at which a result of a certain identifier contributes to the decision of the final result is decided based on a difference between an accumulated evaluation value of all identifiers prior to the concerned identifier in the image window and an accumulated evaluation value, the identification error of which is highest, out of the accumulated evaluation values of all identifiers prior to the concerned identifier upon building up the concerned identifier based on a learning image.

Thirteenth, in the object detecting apparatus according to any one of the first to the eighth of the present invention, a rate of contribution to the accumulated evaluation value in the identifiers at respective nodes is decided based on a difference between an accumulated evaluation value of the image window at parent nodes of the nodes and an accumulated evaluation value, the identification error of which is highest, out of the accumulated evaluation values at the parent nodes of the concerned node upon building up a feature classifier at the concerned node based on a learning image.

Fourteenth, in the object detecting apparatus according to any one of the first to the thirteenth of the present invention, when a plurality of parent nodes are present for a certain node, the object detecting portion searches the accumulated evaluation value, which contains a largest identification error in the accumulated evaluation values at the parent nodes of the concerned node in a learning image upon learning the feature classifier at the concerned node, in a range of the accumulated evaluation values at the parent nodes.

Fifteenth, a learning apparatus of the present invention for an object detecting apparatus, the object detecting apparatus has a node network learning portion for learning dynamically identifiers in a network structure by using a node network in which nodes each having an identifier for identifying the object are connected as a network, and the node network learning portion has a free node generating portion for generating at least one free node in the node network, a learning image collecting portion for collecting a plurality of images used to learn the free node, and a node learning portion for learning the free node by the collected images.

Sixteenth, in the learning apparatus according to the fifteenth of the present invention, the node network learning portion decides whether or not it is possible to generate a new free node, and repeats processes in the free node generating portion, the learning image collecting portion, and the node learning portion based on the decision result.

Seventeenth, in the learning apparatus according to the fifteenth or the sixteenth of the present invention, the free node generating portion generates a node serving as a reference when the node network is free, and generates a new free node by joining and splitting nodes that already exist in the node network.

Eighteenth, in the learning apparatus according to any one of the fifteenth to the seventeenth of the present invention, the free node generating portion removes the node when a number of images collected by the learning image collecting portion is insufficient.

Nineteenth, in the learning apparatus according to any one of the fifteenth to the eighteenth of the present invention, the learning image collecting portion gives the image the node network being built up as an input, propagates the image to share the image among the free nodes by propagating the image, and collects images arriving at respective free nodes.

Twentieth, in the learning apparatus according to any one of the fifteenth to the nineteenth of the present invention, a boosting algorithm is applied to the node learning portion.

Twenty-first, in the learning apparatus according to the twentieth of the present invention, the node learning portion decides a subset from collected images in compliance with the boosting algorithm, and attaches a weight to collected images respectively by using the subset.

Twenty-second, in the object detecting apparatus according to any one of the first to the fourteenth of the present invention, the object detecting portion detects the object by utilizing both spatial distribution information of pixels and strength information of pixels in the image window.

Twenty-third, in the object detecting apparatus according to the twenty-second of the present invention, the spatial distribution information of pixels indicates a magnitude relationship of the feature quantity values in respective pixel blocks and an arrangement relationship of respective pixel blocks on the image, among a plurality of pixel blocks each constructed by one pixel or more.

Twenty-fourth, in the object detecting apparatus according to the twenty-third of the present invention, the strength information of pixels indicates a magnitude relationship of strengths of the feature quantity values in respective pixel blocks in connection with the spatial distribution information.

Twenty-fifth, in the object detecting apparatus according to the twenty-third or the twenty-fourth of the present invention, a rectangular template is applied to each of the pixel blocks.

ADVANTAGES OF THE INVENTION

According to the present invention, the object detecting apparatus capable of suppressing an increase of processing loads with high accuracy, and the learning apparatus for the same can be provided.

BRIEF DESCRIPTION OF THE DRAWINGS

FIG. 14 A view showing another example of the rectangular template for feature extraction according to the embodiment of the present invention.

FIG. 15 A view explaining the problem of a rectangle feature in the prior art.

Figure 1:
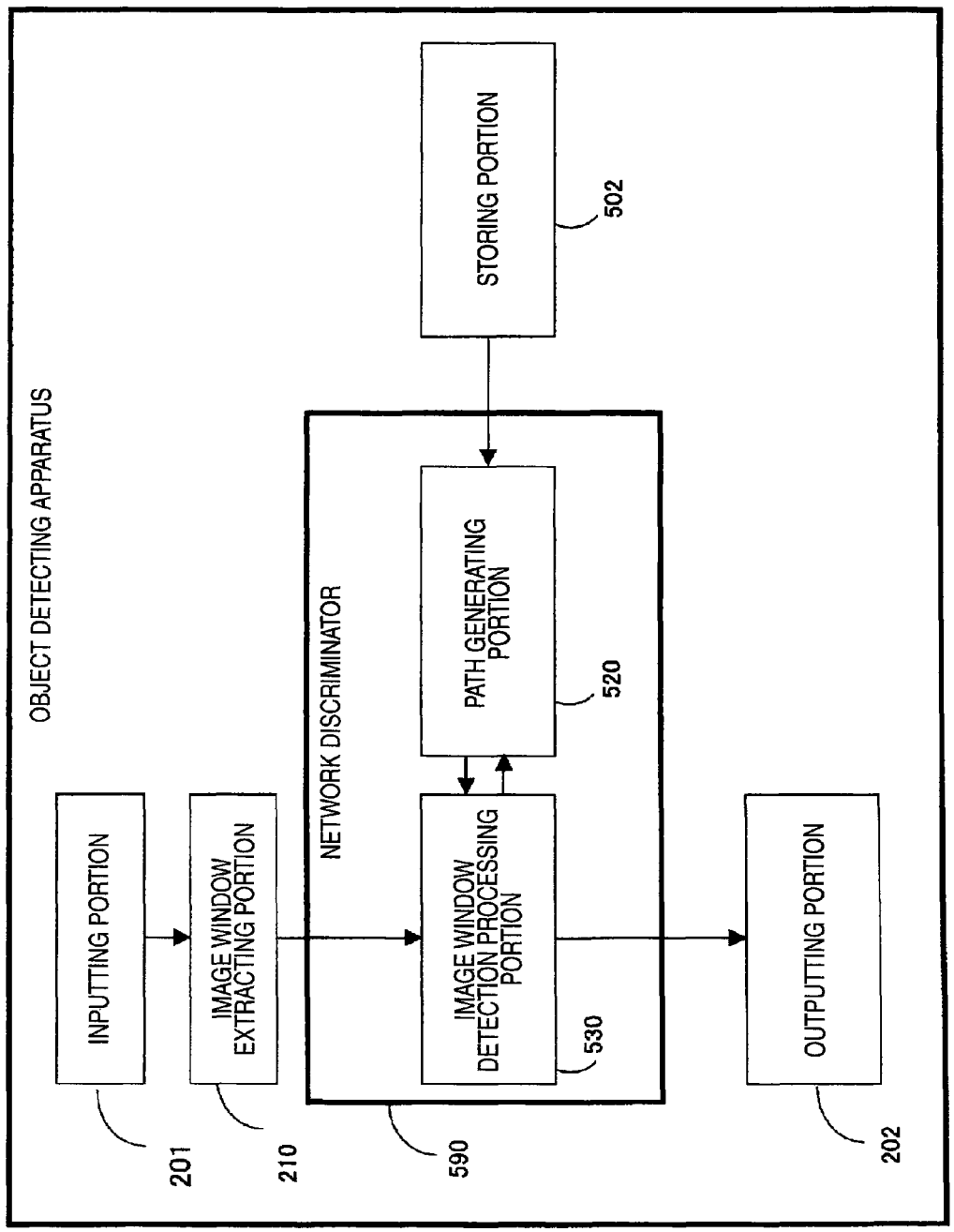
FIG. 1 A block diagram showing a schematic configuration of an object detecting apparatus according to an embodiment of the present invention.

DESCRIPTION OF REFERENCE NUMERALS 201 inputting portion
202 outputting portion
210 image window extracting portion
390 feature extracting portion
502 storing portion
520 path generating portion
530 image window detection processing portion
590 network discriminator
710 free node generating portion
720 image sample collecting portion
730 node learning portion
790 network learning portion

BEST MODE FOR CARRYING OUT THE INVENTION

Next, an object detecting apparatus according to an embodiment of the present invention will be explained hereinafter. In the following, explanation will be made while using a human face as an object by way of concrete example.

<Configuration of Detecting System>

FIG. 1 is a block diagram showing a schematic configuration of an object detecting apparatus according to an embodiment of the present invention. As shown in FIG. 1, the object detecting apparatus according to the present embodiment includes an inputting portion 201, an image window extracting portion 210, a storing portion 502, a network identifier 590, and an outputting portion 202.

The image window extracting portion 210 extracts a plurality of image windows from an image input from the inputting portion 201. Here, the "image window" means a partial area in the input image. A large number of windows in which a position or a size of the partial area is changed can be cut out from the input image.

Figure 2:
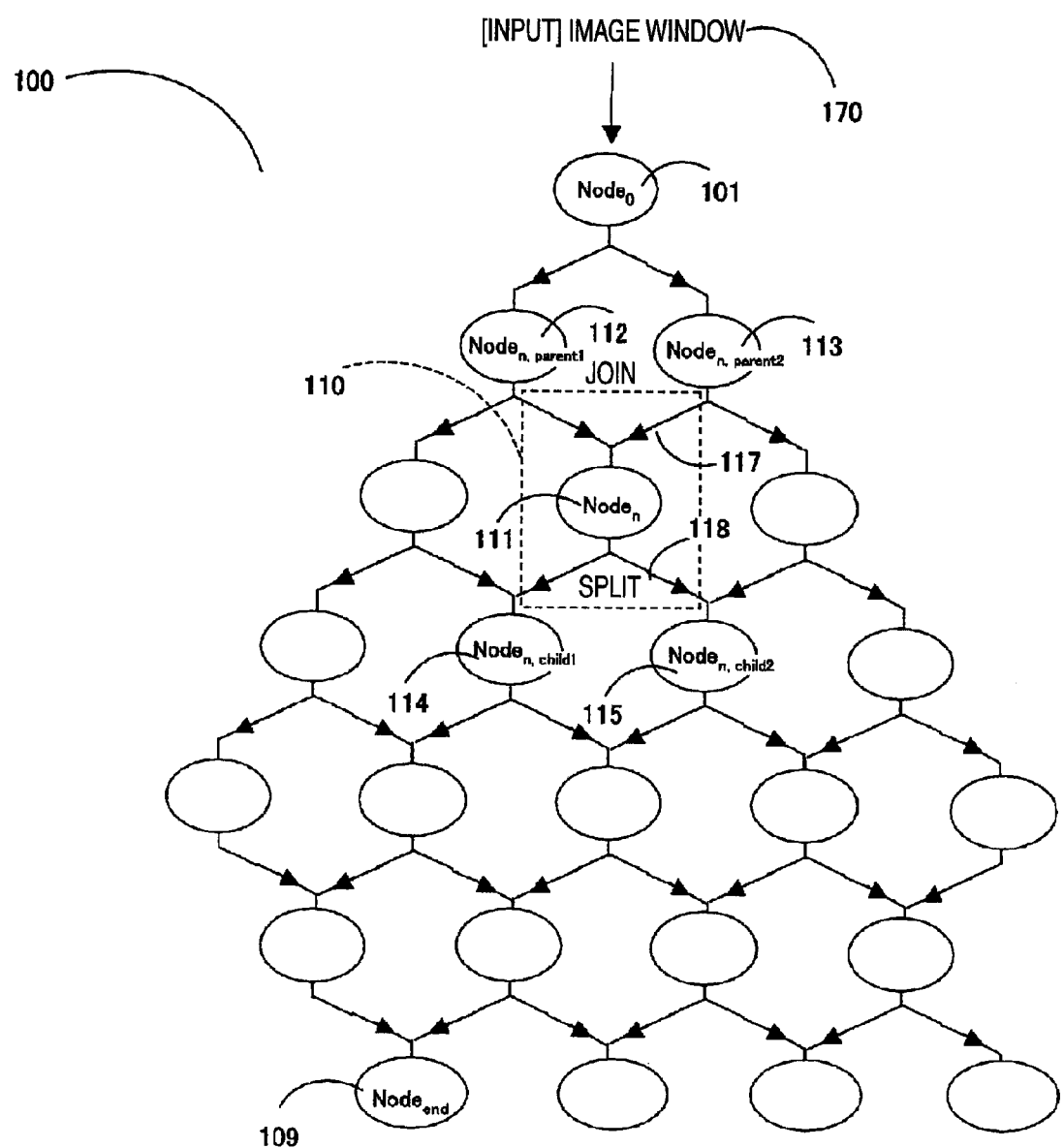
FIG. 2 A conceptual, view showing a node network according to the embodiment of the present invention.

The storing portion 502 accumulates node networks. FIG. 2 is a conceptual view showing a node network according to the embodiment of the present invention. A network 100 has a plurality of nodes arranged on the network.

In FIG. 2, a basic unit 110 of the network is shown. The basic unit 110 is composed of a "node N" 111 as one node, a joint portion 117 for joining connections from M nodes at a maximum, and a split portion 118 for splitting into N nodes at a maximum. For example, the case of M=N=2 is illustrated in FIG. 2. Also, the M modes are called a parent node of the node N, and the N nodes are called a child node of the node N.

In the case in FIG. 2, the parent node of the node N is nodes 112, 113 respectively and the child node of the node N is nodes 114, 115 respectively. The node having no parent node is called a route node (in FIG. 2, 101). An input image 170 is input into the route node 101.

Each node has a plurality of identifiers, and the identifier has a feature classifier $h_n$, an object identifier $H_n$, and an identification error function $E_n$. The identifier can be built up by using the boosting locally, as recited in Jin R., Hauptmann A., Carbonell J., Si L., Liu Y., "A New Boosting Algorithm Using Input Dependent Regularizer", 20th International Conference on Machine Learning (ICML '03), Washington D.C., Aug. 21-23, 2003 (referred to as "Literature A" hereinafter), for example. The weak classifier in the boosting learning method may be used as the feature classifier, and the strong classifier in the boosting learning method may be used as the object identifier.

The explanation will return to the object detecting apparatus in FIG. 1. The network identifier 590 is the identifier having the network structure, and acquires the image window from the image window extracting portion 210 and then identifies whether or not the object is contained in each image window, by using the node network accumulated in the storing portion 502.

The network identifier 590 has a path generating portion 520, and an image window detection processing portion 530. The path generating portion 520 reads the information of the node network accumulated in the storing portion 502, and generates at least one path (route) or more. The path is a sequence of nodes chosen to process the image window.

The image window detection processing portion 530 acquires the image window from image window extracting portion 210 and process the image window via the path generated by the path generating portion 520. Here, in each path, the identified result indicating whether or not the image window contains the object is generated by executing the operation by the identifier (the feature classifier $h_n$, the object identifier $H_n$, the identification error function $E_n$) at each node mentioned above. As the identified result to be output, the identified result whose identification error is lowest is chosen and is accumulated in the outputting portion 202.

Then, the image window detection processing portion 530 instructs the path generating portion 520 to generate a new path, and repeats the above identifying process until a new path is not generated any more or until the repetition reaches a predetermined number of times.

Figure 3:
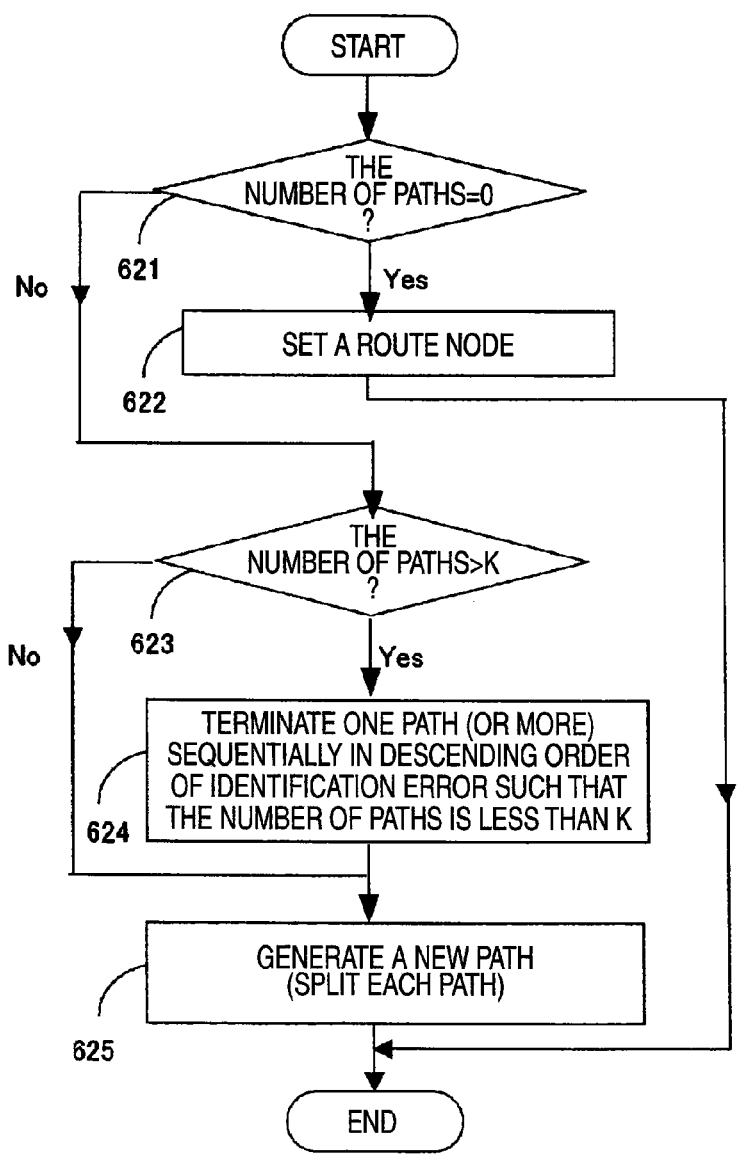
FIG. 3 A flowchart showing processing procedures of a path generating portion according to the embodiment of the present invention.

FIG. 3 is a flowchart showing processing procedures of the path generating portion according to the embodiment of the present invention. First, the path generating portion 520 decides whether or not there is the generated path in the network (step 621). If no path is present, the path containing only the route node is generated (step 622). Then, the path generating process is ended.

If the path is present, the path generating portion 520 decides whether or not the number of paths generated in the network is larger than K that is set previously (step 623). For example, 1, 2, 3, or the like is set as the value of K. If the number of paths exceeds K, the path having a higher identification error is terminated such that the number of paths is suppressed to K at a maximum (step 624). Here, a decision is made based on the paths that have already been detected by the image window detection processing portion 530. Also, the wording "the path is terminated" means that the input image input via a certain path is not processed any more.

The path is generated much more by splitting the current paths respectively (step 625). For example, the case where a certain path contains $\{node_0, node_a, node_b\}$ will be considered. At this time, for example, a $node_{b,\ child1}$ and a $node_{b,\ child2}$ are generated as the child node of the node b, and new paths $\{node_0, node_a, node_b, node_{b,\ child1}\}$ and $\{node_0, node_a, node_b, node_{b,\ child2}\}$ are generated.

Figure 4:
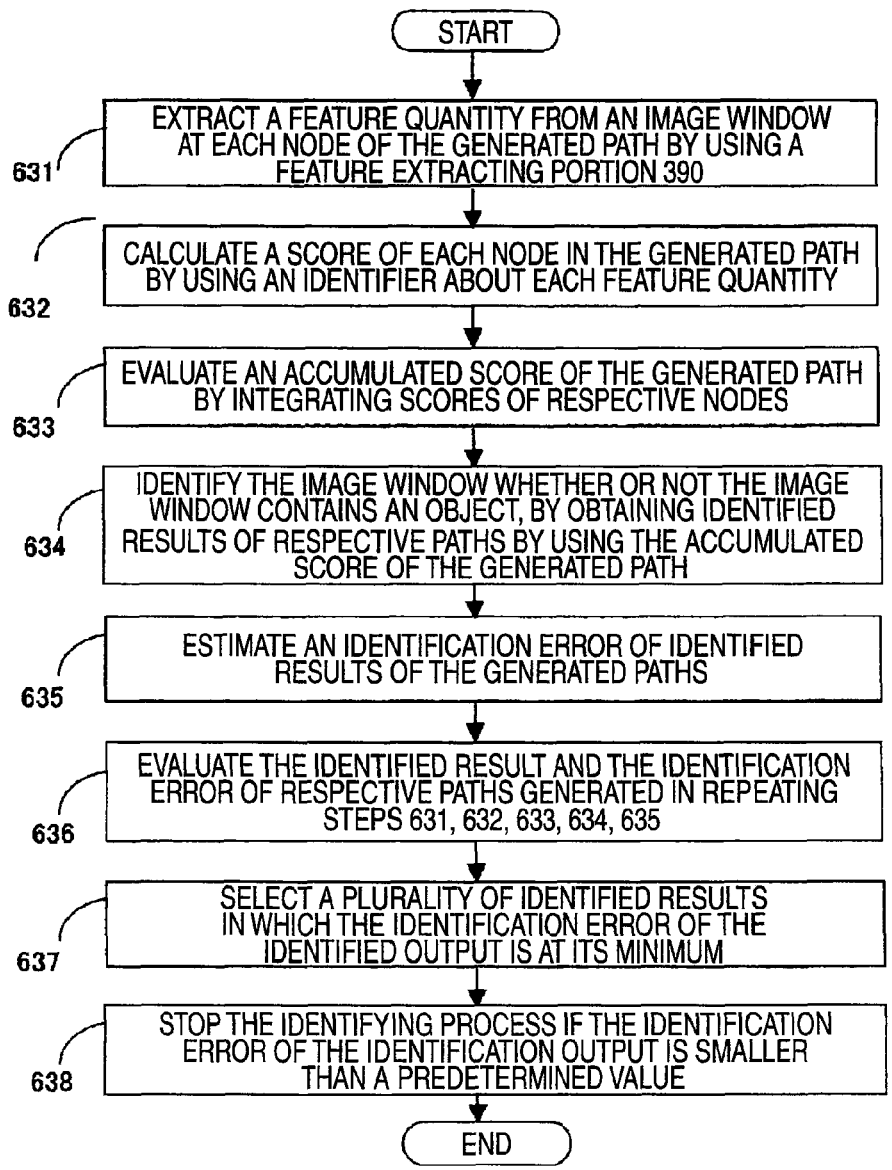
FIG. 4 A flowchart showing processing procedures of an image window detection processing portion according to the embodiment of the present invention.

FIG. 4 is a flowchart showing processing procedures of an image window detection processing portion according to the embodiment of the present invention.

The image window detection processing portion 530 evaluates the identified result of respective generated paths indicating whether or not the image window contains the object. The identified result may be obtained by the local boosting as recited in above Literature A, for example. The identified result to be output is chosen from all identified results of the generated paths. Respective steps of the flowchart in FIG. 4 will be explained hereunder.

First, the image window detection processing portion 530 extracts the feature quantity from the input image window at each node of the generated path (step 631). Here, it is assumed that the input image window is X and the feature quantity extracted at the node N is $f_n(X)$. The feature extraction is processed by using a feature extracting portion 390 shown in FIG. 10, for example, and its details will be described later.

Then, the extracted feature quantity $f_n(X)$ is given to the identifier, and a score $h_n(X)$ of each node in the generated path is calculated (step 632). The score $h_n(X)$ is derived by the feature classifier $h_n$, and is calculated by following Formula (1).

[Formula 1]

$$h_n(X)=\text{Prob}(Y=+1|f_n(x))-\text{Prob}(Y=-1|f_n(X)) \tag{1}$$

In above Formula (1), Prob (k) denotes a probability with which an event k will happen. Y=+1 and Y=−1 signify respectively the case where the input image contains the object and the case where the input image does not contain the object.

Then, scores of respective nodes are integrated to evaluate an accumulated score $S_n(X)$ of the generated path (step 633). The accumulated score $S_n(X)$ may be calculated by following Formula (2).

[Formula 2]

$$S_n(X)=S_{n,parent}(X)+\exp(-|S_{n,parent}(X)-\alpha_n|)*h_n(X) \tag{2}$$

wherein, $S_{0,parent}(X)=0$, $\alpha_0=0$

A regularization function exp $(-|S_{n,\ parent}(X)-\alpha_n|)$ localizes an effect generated by the feature classifier $h_n(X)$ in response to the input image, and adds the input image X to the accumulated score $S_n(X)$ only when $S_{n,parent}(X)$ takes a value that is sufficiently close to a regularization parameter $\alpha_n$. Therefore, in a certain case, exp $(-|S_{n,\ parent}(X)-\alpha_n|)$ becomes almost 0, and sometimes a new value $S_n(X)$ takes a value that is not relatively different from the old value $S_{n,parent}(X)$.

Then, the image window detection processing portion 530 decides whether or not the image window contains the object, based on the accumulated score $S_n(X)$ and the identified result $H_n(X)$ of each path (step 634). Here, the identified result $H_n(X)$ may be derived from the object identifier $H_n$ or may be calculated by following Formula (3).

[Formula 3]

$$H_n(X) = \begin{cases} +1 & \text{if } Prob(Y=+1 \mid S_n(X)) > Prob(Y=-1 \mid S_n(X)) \\ -1 & \text{otherwise} \end{cases} \quad (3)$$

$H_n(X)=+1$ means the identified result indicating that the image window contains the object, and $H_n(X)=-1$ means the identified result indicating that the image window does not contain the object.

Then, the image window detection processing portion 530 estimate an identification error $E_n(X)$ of the identified results of the paths (step 635). The identification error can be derived by the error function $E_n$ (error function) or may be calculated by following Formula (4).

[Formula 4]

$$E_n(X)=Prob(H_n(X)\neq Y|S_n(X)=Prob(H^n(X)\neq Y|S_{n,parent}(X),h_n(X)) \quad (4)$$

Also, in order to reduce the processing load applied in calculation, the function hn may be installed as a look-up table given by following Formula (5). Also, the functions En, Hn, and Sn may be installed as a two-dimensional look-up table given by following Formula (6).

[Formula 5]

$$h_n(X)=\text{LookUpTable}(f_n(X)) \quad (5)$$

[Formula 6]

$$[E_n(X),S_n(X),H_n(X)]=\text{LookUpTable}(S_{n,parent}(X), h_n(X)) \quad (6)$$

Then, the image window detection processing portion 530 evaluates the identified results and the identification error (error function) of respective paths by repeating steps 631 to 635 (step 636). Then, the image window detection processing portion 530 selects the identified result which has the lowest identification error from the identified results of the generated paths as the output result (step 637).

Then, when the identification error of the output result is smaller than a predetermined value, the image window detection processing portion 530 terminates the identifying process (step 638). In this case, when the identification error of the output result is not smaller than a predetermined value, the image window detection processing portion 530 instructs the path generating portion 520 to generate a new path. Then, the path generating portion 520 generates the path.

When the image window detection processing portion 530 of the network identifier 590 identifies the image window in this manner such that the window contains the object, the outputting portion 202 outputs the information of a position (e.g., coordinate values on the input image), a size, etc. of the image window.

In this manner, since the path generating portion 520 joins and splits the network, a large number of paths can be built up. Also, respective paths are used in evaluating the identified result, and the network serves as a pool of a large number of sensors. The output result that is more reliable than that obtained by a single identifier can be output by using a group of sensors.

In addition, the number of paths is restricted by K to ensure a high-speed identifying process. In order to ensure the best identified result, the path is generated dynamically and also the path having a high identification error is terminated during the identifying process. Therefore, only the path having a low identification error with respect to the input is used.

As a result, the parallel sensors are operated statistically in the parallel arrangement in the prior art and cannot be varied during the identifying process, while the utilized sensors are dynamically changed in the object detecting apparatus the present embodiment and the unnecessary processes can be suppressed.

Also, because the boosting algorithm is utilized in the image window detection processing portion 530, it is ensured that the identification error of the newly generated path is reduced statistically smaller than that of the old path. Also, above Formula (2) can ensure that the boosting is applied locally and the identifier $h_n(X)$ acts on only the subset of the input image.

Also, because of the present approach that stops the process whose identification error is sufficiently low, a speed-up of the identifying process can be realized. This is because the easy-process input image can be identified in an early stage even though the input image may contain the object or not and thus the number of nodes necessary for the discrimination can be suppressed small.

Also, the present approach can recognize only the input image window that is identified not to contain the object in an early stage, and then executes the process by a fixed number of identifiers. Therefore, the present approach is more effective than the cascade structure in the prior art.

<Learning Method and System for Object Detection>

Figure 5:
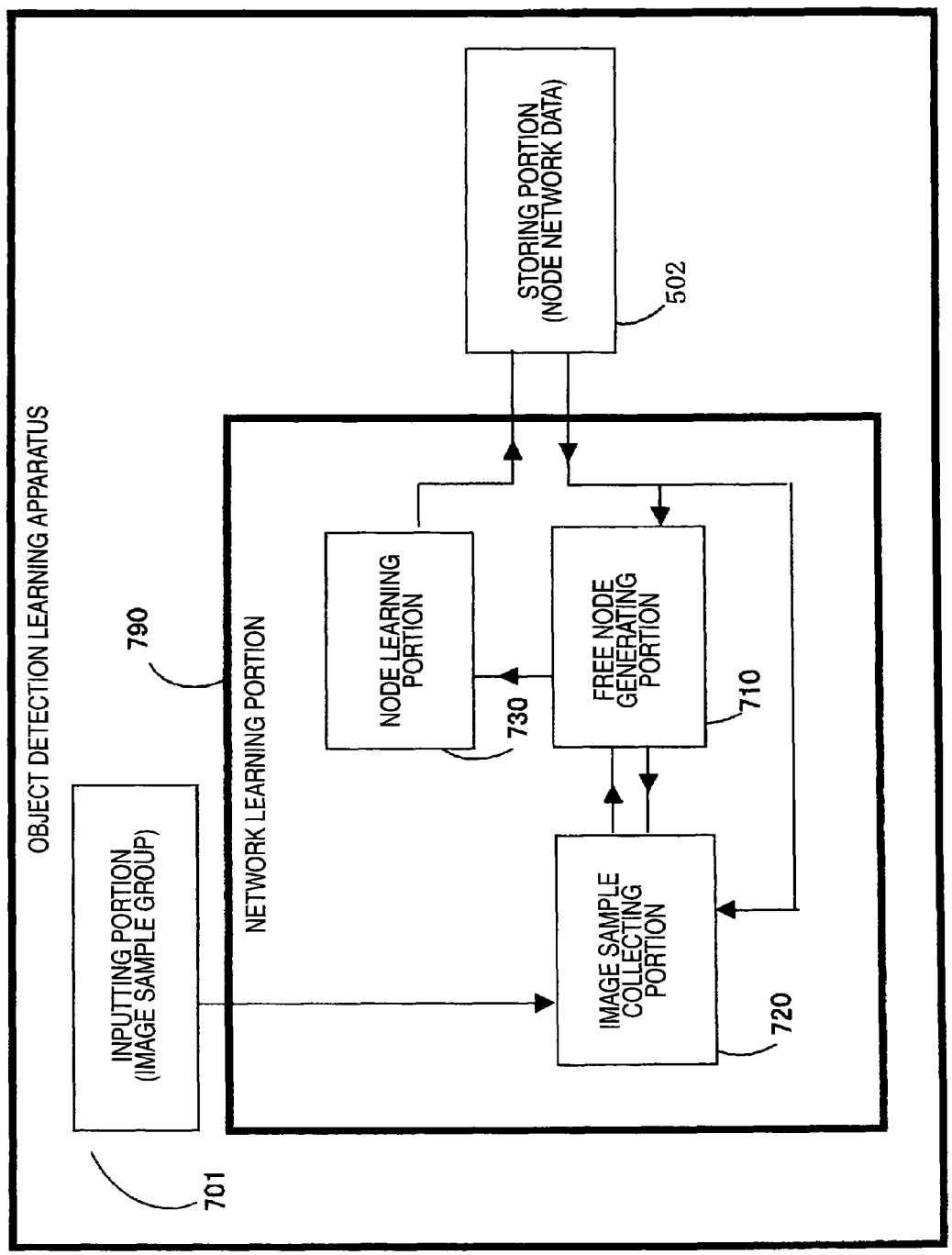
FIG. 5 A block diagram showing a schematic configuration of an object detection learning apparatus according to the embodiment of the present invention.

FIG. 5 is a block diagram showing a schematic configuration of an object detection learning apparatus according to the embodiment of the present invention. The like reference symbols are affixed to the redundant portion with the object detection system shown in FIG. 1. As shown in FIG. 5, the object detection learning apparatus includes an inputting portion 701, a network learning portion 790, and a storing portion 502. This object detection learning apparatus receives a plurality of image samples accompanied with information of the decision result (whether or not the object is present), and causes the identifiers of the nodes of the node network used in the object detecting apparatus to learn. In this case, the image sample containing the target object is called a positive sample, and the image sample not containing the target object is called a negative sample.

When a plurality of image samples are given to the inputting portion 701, the network learning portion 790 decides the node network that has been learned to identify a plurality of image samples. The node network decided herein is accumulated in the storing portion 502, and is used in the identifying process of the network discriminator block 590 to identify whether or not the image window has an instance of the object.

As shown in FIG. 5, the network learning portion 790 has a free node generating portion 710, an image sample collecting portion 720, and a node learning portion 730. Here, the free node denotes the node for which the identifier has not been decided, and the learned node denotes the node for which the identifier has been decided. In order to decide the identifier for the node of the network, for example, the local boosting algorithm set forth in above Literature A may be employed.

First, the free node generating portion 710 reads the current node network saved in the storing portion 502 and generates the free node for the purpose of learning. Then, the free node generating portion 710 collects a predetermined number of image samples from a plurality of input image samples 701 by using the image sample collecting portion 720. If the number of the collected image samples is smaller than a predetermined number, the free node is deleted because the node learning portion 730 cannot execute the learning.

Then, the node learning portion 730 decides finally the identifiers that correspond to respective free nodes generated by using the image samples collected by the image sample collecting portion 720.

These learning processes are repeated until the free node is not generated by the free node generating portion 710.

Figure 6:
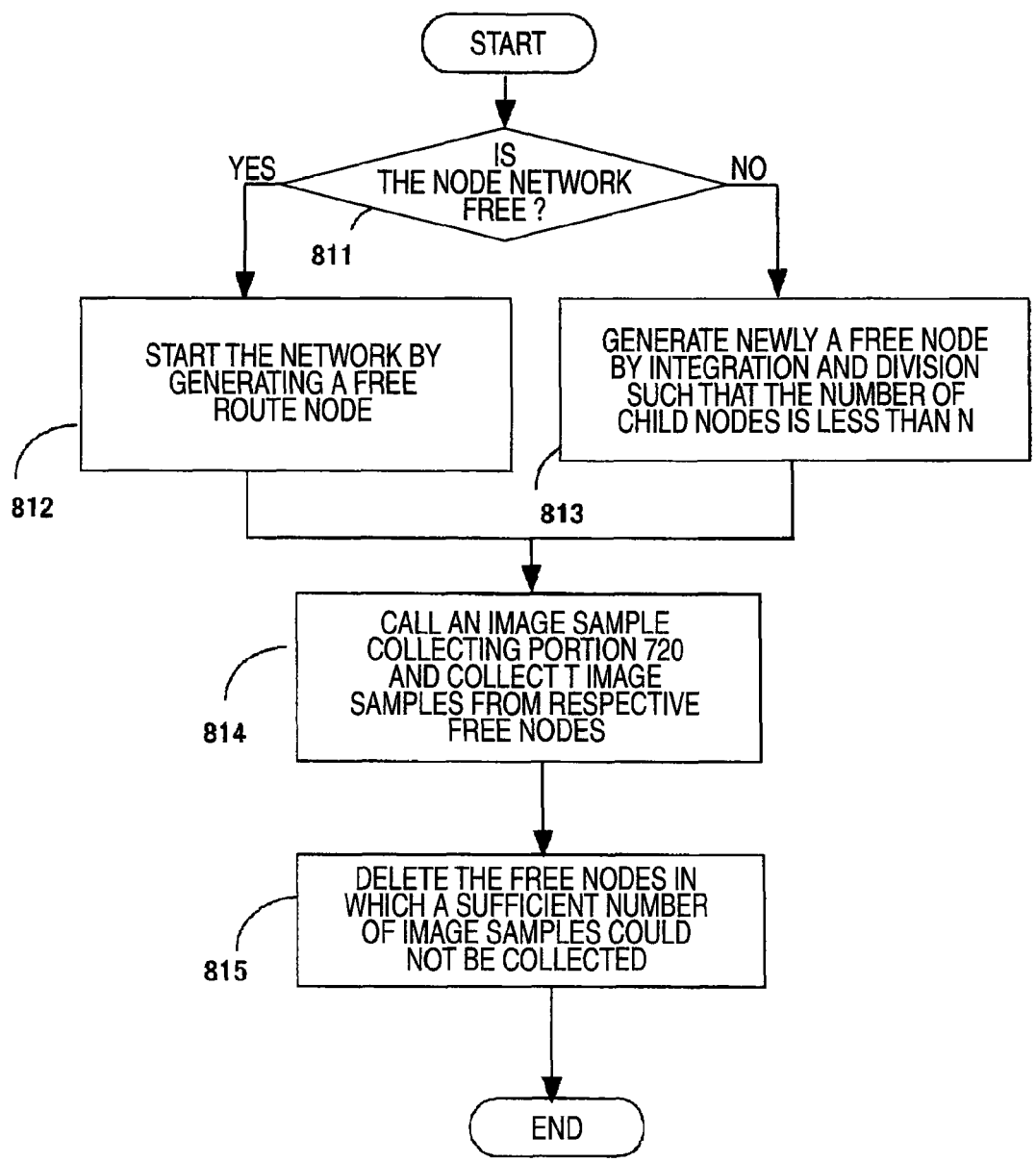
FIG. 6 A flowchart showing processing procedures of a free node generating portion according to the embodiment of the present invention.

FIG. 6 is a flowchart showing processing procedures of a free node generating portion according to the embodiment of the present invention. In step 811, it is decided whether or not the node network is free. When no node is present, the network is assumed as free. If the node network is free, the network is start by generating the free route node (node$_0$) (step 812).

In contrast, if the node network is not free, i.e., if at least one node is present, a new free node is generated by joining and splitting the nodes such that the number of child nodes is less than N (step 813). Here, this free node generating process will be explained hereunder.

Figures 7A, 7B:
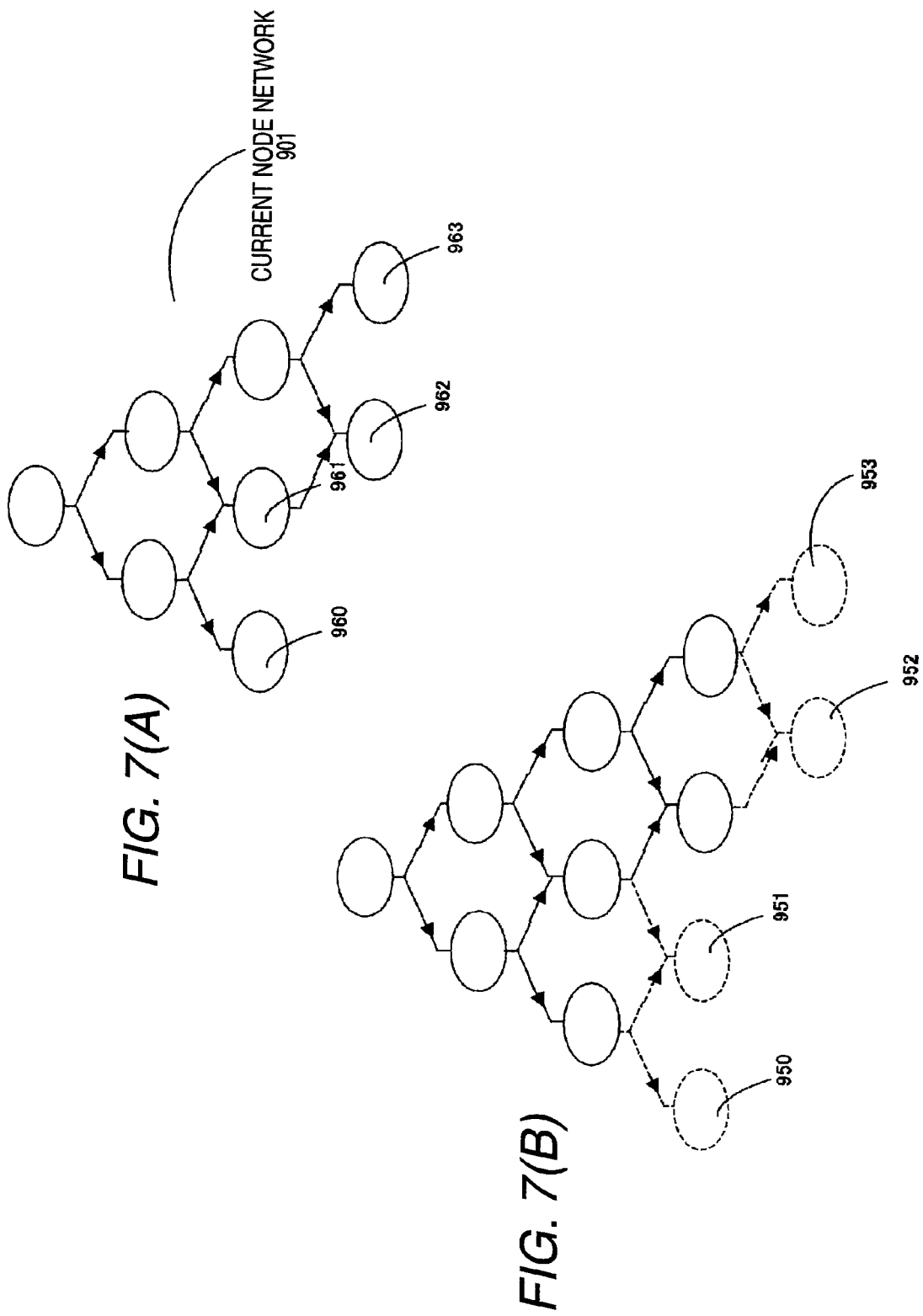
FIG. 7 A conceptual view explaining a free node generation according to the embodiment of the present invention.

FIG. 7 is a conceptual view explaining a free node generation according to the embodiment of the present invention. Respective free nodes 950, 951, 952, 953 are formed by splitting nodes 960, 961, 962, 963 from a current node network 901 such that the neighboring free nodes share the common parent. For example, the node 950 and the node 951 have one common parent node.

Returning to FIG. 6, procedures of generating the free node will be explained hereunder. In step 814, a predetermined number T (e.g., 10000) of image samples are collected in the free nodes by the image sample collecting portion 720 respectively.

In step 815, the free nodes in which a sufficient number of image samples could not be collected are deleted. For example, when the number of image samples is smaller than T, the free nodes are deleted.

Figure 8:
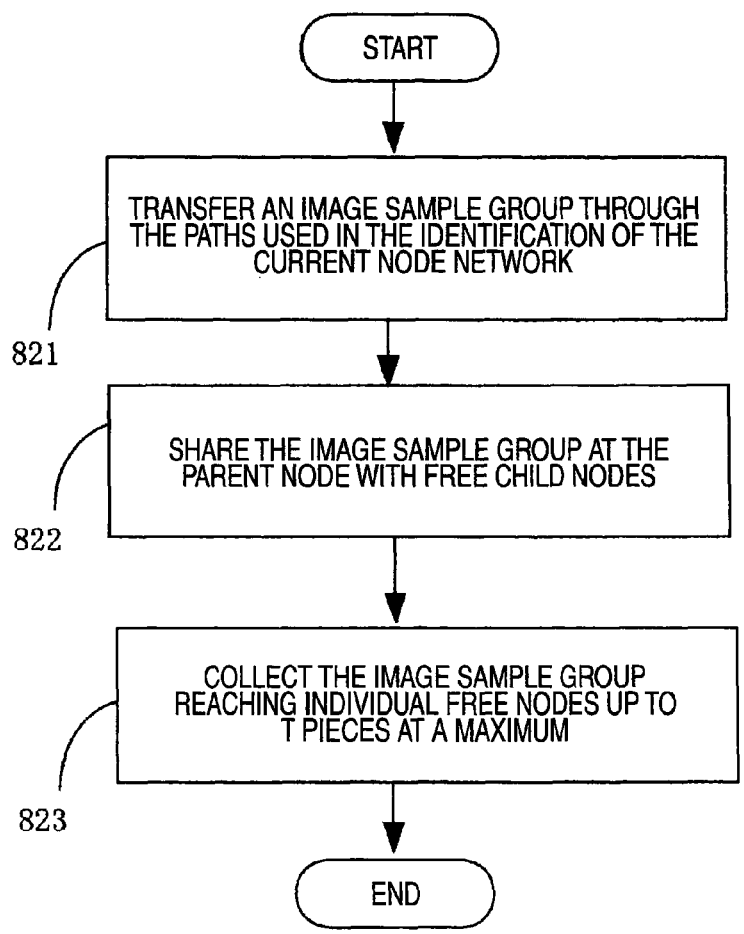
FIG. 8 A flowchart showing processing procedures of an image sample collecting portion according to the embodiment of the present invention.

FIG. 8 is a flowchart showing processing procedures of the image sample collecting portion according to the embodiment of the present invention.

In step 821, the input image sample group 701 is transferred by using the paths used in the identification of the node network saved in the storing portion 502. For example, in step 821, the image sample collecting portion 720 executes the similar process as the network identifier 590, and generates one route or more used to identify one image sample by the same operation as that taken in sensing the object. A copy of the image sample is generated, propagates through the generated paths of the network, and arrives at the node at the trailing end of the route. At that time, because the routes generated in multiple ways may be present on the network, sometimes the multiple copies of the image sample arrive at the same node.

In this case, an operation of the image sample collecting portion 720 is the same operation of the network identifier 590 as that in sensing the object. Therefore, when the identification error in identifying the image is suppressed sufficiently small at a certain node, the path for the image is terminated there and also the number of paths is restricted less than a predetermined number.

In step 822, the image sample group that has arrived at the parent node is shared with the free child nodes. (For example, when a plurality of parent nodes are present at one child node, the child node picks up an union of the image sample groups from the respective parent nodes as the image sample. When a plurality of child nodes are present at one parent node, respective child nodes take over the same image sample group from the common parent node.) That is, the copy of the image that has arrived at the parent node in step 821 is generated in the child node respectively.

The positive sample is represented as (X, Y=+1), and the negative sample is represented as (X, Y=−1). The accumulated score $S_{n, parent}(X)$ of the image sample at the parent nodes is decided with respect to one free node n by Formula (2). The image sample group at the free node is represented as $(X, Y, S_{n, parent}(X))$.

In step 823, the image sample collecting portion 720 collects the image samples reaching individual free nodes up to T pieces at a maximum. For example, the image sample collecting portion 720 selects the T/2 positive sample and the T/2 negative sample at random from all image samples that arrive at the free nodes.

Figure 9:
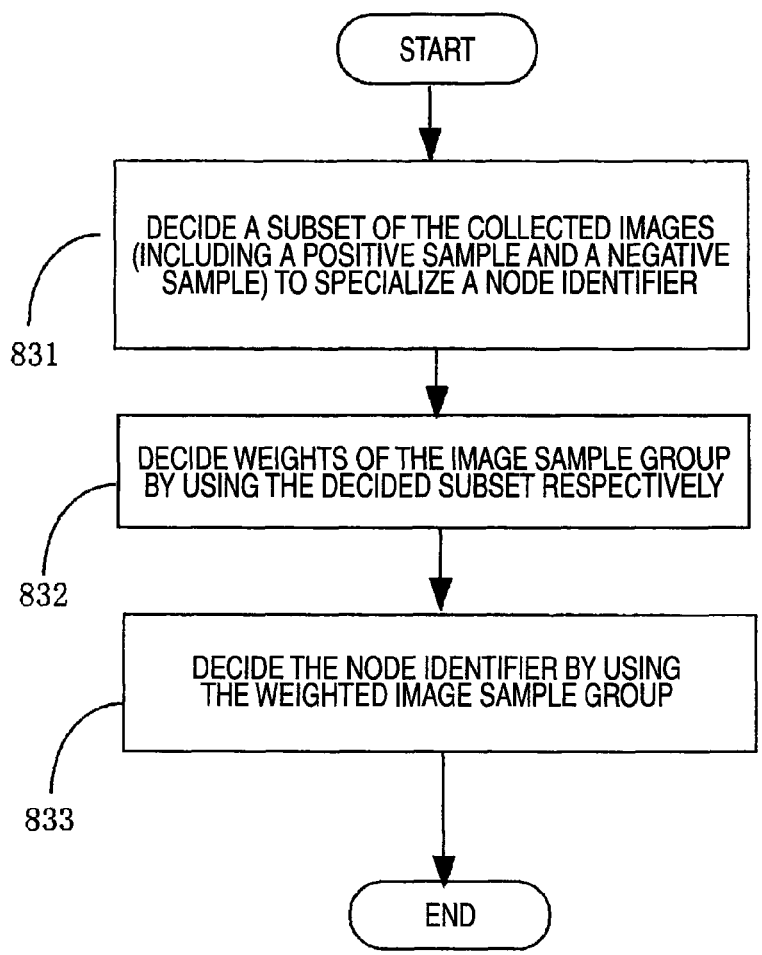
FIG. 9 A flowchart showing processing procedures of a node learning portion according to the embodiment of the present invention.

FIG. 9 is a flowchart showing processing procedures of the node learning portion according to the embodiment of the present invention.

The node learning portion 730 decides the subset of the image sample groups collected to learn the free node n such that the identification error is increased at the parent node. Then, a weight function is decided in such a way that the identifier being localized and specialized to focus on the learning in the subset is generated. An action of this node learning portion will be explained in due order.

In step 831, the node learning portion 730 decides the subset of the image sample applied to specialize the identifier of the node, by changing a weight applied when the accumulated score is considered, in response to the image sample. The subset of the image sample is the subset that gives the highest identification error at the parent node. The procedures will be given as follows.

First, the image sample group collected by the image sample collecting portion 720 is represented as $(X, Y, S_{n, parent}(X))$. Then, the current identification error $E_{n, parent}(X)$ for the image sample group is decided by above Formula (4). Then, a value of the regularization parameter can is decided by following Formula (7) while using the identification error $E_{n, parent}(X)$.

The value an is selected between $\alpha_{an, parent1}$ and $\alpha_{n, parent2}$ by Formula (7) such that the image sample group having the parent accumulated score $S_{n, parent}(X)$ that is close to $\alpha_n$ has the maximum identification error $E_{n, parent}(X)$ at the parent node. That is, the selection is made to learn the image that could not be identified satisfactorily at the preceding stage, in a concentrated manner. Therefore, it is expected that the identifier at the node n learns the subset of the image samples, which are selected such that the identification error goes to a maximum at the parent node, to reduce the identification error.

The value $\alpha_n$ is decided by following Formula (7) while using a regularization function $\exp(-|S_{n, parent}(X)-\alpha|)$. Both the regularization function and the accumulated score are same as those in the object detecting apparatus.

[Formula 7]

$$\alpha_n = \underset{\alpha_{n,parent1} < \alpha < \alpha_{n,parent2}}{\operatorname{argmax}} \left\{ \sum_{\substack{\text{All collected} \\ \text{image samples}}} E_{n,parent}(X) * \exp(-|S_{n,parent}(X) - \alpha|) \right\} \quad (7)$$

That is, α that maximizes a total sum of products of the identification error at the parent node and the regularization function in all collected image samples is selected as $\alpha_n$ in a range of $\alpha_{n,\ parent1} < \alpha < \alpha_{n,\ parent2}$. In this case, when three parent nodes or more are present, a selection range of α is set as $\min(\alpha_{n,parent}) \leq \alpha \leq \max(\alpha_{n,parent})$. At this time, when only a single parent node is present, a value given by following Formula (8).

[Formula 8]

$$\begin{cases} \alpha_{n,parent1} = -\infty & \text{node}_{n,parent1} \text{ is not exist} \\ \alpha_{n,parent2} = +\infty & \text{node}_{n,parent2} \text{ is not exist} \end{cases} \quad (8)$$

In this way, the subset of the image samples to specialize the identifier is decided as the set of the image samples, which maximizes the identification error at the parent node, by step 831.

Then, in step 832, the node learning portion 730 decides weights of all collected image samples by using the subset decided in step 831 respectively. The weighted learning sample group is represented as (X, Y, w(X)). Here, a weight function w(X) is represented mathematically by following Formula (9).

[Formula 9]

$$w(X) = \exp(-|S_{n,parent}(X) - \alpha_n|) * \exp(-Y * S_{n,parent}(X)) / W_{sum} \quad (9)$$

Where $W_{sum}$ is a normalization constant when w(X) is a distribution. In this Formula, the weight is large in a situation that $|S_{n,\ parent}(X) - \alpha| \approx 0$, and the weight is large in a situation that $|S_{n,\ parent}(X) - \alpha|$ is large.

Then, in step 833, the node learning portion 730 decides various node identifiers of nodes n by using the weighted image sample group. The identifiers to be decided are the feature classifier $h_n$, the object identifier $H_n$, and the identification error function $E_n$ given by Formulae (1), (3), (4) respectively. Here, one feature quantity that can give the best identification is selected from the feature quantities found in the boosting algorithm in above Literature A, for example, and is used as the feature quantity.

Also, the feature classifier $h_n$ may be decided by following Formula (10).

[Formula 10]

$$h_n(X) = P_w(Y=+1 \mid f_n(X)) - P_w(Y=-1 \mid f_n(X)) = \frac{\sum w_+ - \sum w_-}{\sum w_+ + \sum w_-} \quad (10)$$

In this Formula, $P_w(j)$ denotes a weighted probability with which an event j happens in the distribution w. Also, $f_n(X)$ is the feature quantity of the image sample X extracted by using the best selected feature quantity (=gives the best identified result), for example, the feature quantity extracted by using the feature extracting portion 390 (described later) in FIG. 10. Also, $\Sigma w_+$, $\Sigma w_-$ are a total sum of weights of the positive samples and the negative samples having the feature quantity $f_n(X)$ respectively.

The accumulated score $S_n(X)$ is decided by Formula (2) using values of the regularization parameter an and the feature classifier $h_n(X)$. As a result, the conditional probability is decided by following Formulae (11), (12).

[Formula 11]

$$\text{Prob}(Y=+1 \mid S_n(X)) = \frac{C_+}{C_+ + C_-} \quad (11)$$

[Formula 12]

$$\text{Prob}(Y=-1 \mid S_n(X)) = \frac{C_-}{C_+ + C_-} \quad (12)$$

Where $C_+$, $C_-$ are the count (number of piece) of the positive samples and the negative samples having the accumulated score $S_n(X)$ respectively. The object identifier $H_n$ is decided by Formula (3) using the conditional probability.

Also, the identification error En(X) of the object identifier is represented by following Formula (13).

[Formula 13]

$$E_n(X) = \min\{\text{Prob}(Y=+1 \mid S_n(X)), \text{Prob}(Y=-1 \mid S_n(X))\} \quad (13)$$

Where min{a,b} denotes a minimum value of a and b respectively. In this manner, the feature classifier $h_n$, the object identifier $H_n$, and the identification error function $E_n$ at each node are decided. The node learning process is completed by a series of procedures mentioned above.

In this manner, the network learning portion 790 in the embodiment of the present invention possesses following advantages.

First, the object can be decided by the free node generating portion 710 using the identified results of a plurality of routes. Therefore, the network learning portion 790 possesses such an advantage that the decision can be made more effectively than the cascade structure in the prior art.

In the present embodiment, because the joining and the splitting of the nodes are employed, more than one upper layer node that is connected to one lower layer node via the connection path is present. Since the feature classifiers that have learned by the boosting algorithm are used as the feature classifiers of respective nodes and the result of these identifiers are transferred to one lower layer identifier or more, the lower layer identifier can make a decision of the object by employing all information of the identifiers in these plural routes.

This merit and such a merit that the decision can be made by employing all information of the identifiers in plural routes constitute the advantage over the cascade structure in the prior art, in which the weak identifier at one stage have no information of the weak identifier at another stage. In contrast, in the prior art, the information of the weak identifier is transferred merely to the subsequent weak identifier at the same stage. This advantage corresponds to the third feature described later.

Also, the free node generating portion 710 has the following advantage in a viewpoint of learning. In the object sensor with the cascade structure in the prior art, the weak classifier at a certain stage never utilizes the information of the weak classifier at another stage. In contrast, in the system of the present embodiment, the free node can be caused to learn by utilizing the information of a plurality of weak classifiers belonging to a plurality of stage identifiers in the free node generating flow.

In addition, because the joining and the splitting of the nodes are employed in the present system, there are the paths extending from the route node to the newly generated free node and respective paths extending from the route node to the free node correspond to the stage identifiers. Respective upper layer nodes are the feature classifier that has learned by the boosting algorithm, and the building that can learn the free node by utilizing the results of the feature classifiers belonging to a plurality of stage identifiers is realized.

In the majority voting system known as the example in the prior art, the decision is used in a plurality of sensors that operate in parallel. In contrast, the embodiment of the present invention has following advantages.

First, a limited number of paths are generated in the node network. Hence, a computational complexity is not so increased as the number of paths rather than the majority voting system. Also, the criteria applied to learn/generate a plurality of free nodes in the node network are made clear. Hence, the learning based on a plurality of paths can be carried out effectively, and thus the third problem, i.e., the problem that it is unclear in the majority voting system in the prior art whether or not respective cascade identifiers are operating complementarily, can be solved. In this manner, the ensemble learning that is more effective than the prior art can be realized.

Then, advantages given as follows can be achieved by the image sample collecting portion 720. First, in the embodiment of the present invention, the image sample group is shared with a plurality of free nodes. Therefore, it is possible to learn the nodes of one route or more simultaneously by a sheet of learning image.

As a result, the image samples can be identified effectively by the network identifier, which is constructed by a plurality of routes being arriving at the same free node and utilizes the identified result from a plurality of routes, rather than the case where one image sample is identified by one identifier. This advantage corresponds to the second feature described later. This can be realized by such a system that the image sample collecting portion causes a plurality of free nodes to share the image sample group with each other.

Second, in the embodiment of the present invention, an over-fragmentation of the learning data is never caused even though the number of stages of the identifier is increased, and the stable learning can be executed in the identifiers at the later stage.

In the conventional approach, there is such a drawback that, when the number of stages of the identifier is increased gradually, the number of learning samples that arrive at the identifier is reduced gradually (the excessive fragmentation is caused) and thus the learned result shows strongly the dependency (overlearning) on the learning sample. In the present approach, the image is shared by joining and splitting the nodes to permit the decision via multiple paths. Therefore, the learning sample is never excessively split into the fragments because of the presence of the overlapping of preferential areas of the learning, and the learning result is hard to show the overlearning. As a result, such an advantage can be achieved that the stable learning can be carried out.

Normally, when the learning is executed highly flexibly, there is the tendency such that a statistical original feature of the data is not reproduced but the learning has excessively a dependency on the data set used in such learning. As the index to decide whether or not such model is good, for example, AIC (Akaike's Information Criteria) is known.

In a multivariate analysis, because the model that has a flexibility to make the AIC minimum is employed, it is prevented that the learning has excessively a dependency on the data set used in such learning. Similarly, in the network type identifier of the present invention, an aimless high flexibility results in such a latent danger that the good learned result can be accomplished only to the data set used in the learning, irrespective of whether or not the original model is good. However, in the approach of the present embodiment, various restrictions are imposed such that the learning sample is not excessively fragmented by the node joining, the learning is not carried out when a specified number of images are not collected in the free node, a decision is made by using the identifiers in a plurality of paths, etc., and the danger that a flexibility is increased without purpose can be prevented. As a result, in the present approach, the learned result is hard to show the overlearning.

In addition, advantages given as follows can be obtained by the node learning portion 730 of the present embodiment.

First, the node learning portion 730 builds up the identifier that is specialized for the subset of the image samples that cannot be identified at the parent node. That is, the node learning portion 730 adds a large weight to the image sample group that causes the large identification error at the parent identifier (because the feature classifier $h_n$ has learned based on Formula (10)), by using the weight function of Formula (9).

Second, the node learning portion 730 builds up the identifier $h_n$ in which the influence is localized. That is, only when the large identification error is generated at the parent node, there is the contribution to the accumulated score by this node. In fact, when the large identification error is generated at the parent node, $|S_{n,\ parent}(X)-\alpha_n|$ has a small value in Formula (2). Thus, a term of $\exp(-|S_{n,\ parent}(X)-\alpha_n|)*h_n(X)$ becomes large in the accumulated score, and a value of the identifier $h_n(X)$ at this node is reflected sufficiently in the accumulated score.

Conversely, when the large identification error is not generated at the parent node, $|S_{n,\ parent}(X)-\alpha_n|$ has a large value in Formula (2). Thus, a term of $\exp(-|S_{n,\ parent}(X)-\alpha_n|)*h_n(X)$ becomes small, and the value of the identifier $h_n(X)$ at this node seldom exerts an influence on the accumulated score.

For this reason, the influence on the accumulated score is limited to the case where the identification error is large at the parent node. This event can be replaced with the identifier whose influence is localized.

In this way, the input images that give a large contribution to the accumulated score in respective identifiers are different in the identifiers at respective nodes in one path. Therefore, in individual identifiers, there is the preferential area in which the identifier can operate preferentially not to have an influence on operations of all other identifiers.

On the contrary, in the identifier having the cascade structure listed as the conventional example, as discussed in the first problem, the weak classifier is the linear identifier that applies the process to whole input space, and all weak identifiers must identify all face images as the face. In contrast, the node identifier of the embodiment of the present invention, the face is discriminated from the non-face only in the image sets whose false identification is easily caused by the identifier at the preceding node. Therefore, the input image space in which the node identifier operates is limitative, and the face/non-face identification by this node identifier can be accomplished with a quite simple configuration rather than the case the identifier having the cascade structure. This corresponds to the first feature described later.

In this way, in the embodiment of the present invention, since the preferential space for the input image in which the identifier at each node operates preferentially is provided, an operation of one identifier hardly exerts an influence on an operation of another identifier. This possesses a great advantage over the prior art containing such a problem that the weak identifier operates in the whole input space and will have an influence on the operations of other weak identifiers.

<Feature Extraction>

Figure 10:
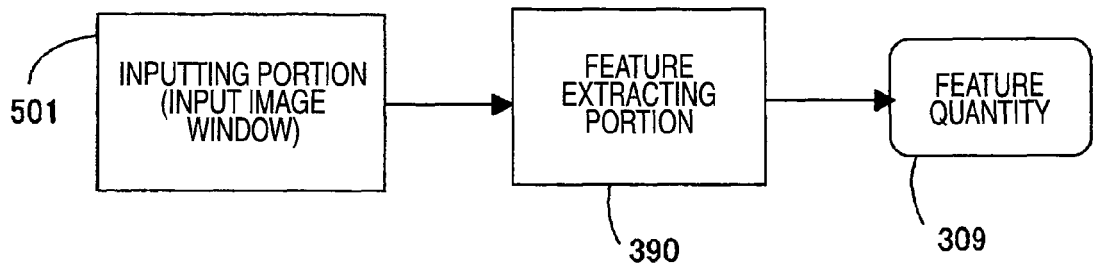
FIG. 10 A block diagram showing a schematic configuration of a feature extracting portion according to the embodiment of the present invention.

FIG. 10 is a block diagram showing a schematic configuration of a feature extracting portion according to the embodiment of the present invention. This feature extracting portion is used in the image window detection processing portion 530 shown in FIG. 1 and the node learning portion 730 shown in FIG. 7, for example.

As shown in FIG. 10, a feature extracting portion 390 extract a feature quantity 309 from the image window being input into an inputting portion 501. This feature quantity 309 is used to identify whether or not the image window contains the object.

For example, step 631 executed by the image window detection processing portion 530 and set forth in FIG. 4 is executed by the feature extracting portion 390.

Figure 11:
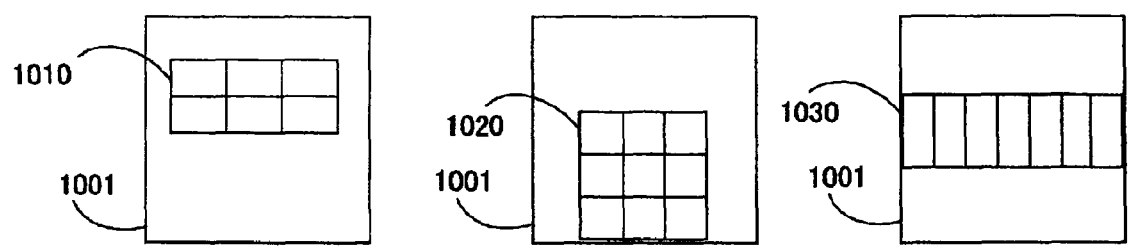
FIG. 11 A view showing an example of a rectangular template for feature extraction according to the embodiment of the present invention.

FIG. 11 is a view showing an example of a rectangular template for feature extraction according to the embodiment of the present invention. The rectangular template contains L rectangular blocks such as oblongs having the same size, etc. in an inside of a given image window 1001. L may be set to any value between 2 to 9, for example. Individual rectangular blocks can be specified by the upper right coordinate, a width w, and a height h.

For example, a rectangular template 1010 shown in FIG. 11(A), a rectangular template 1020 shown in FIG. 11(B), and a rectangular template 1030 shown in FIG. 11(C) contain 6, 9, 7 rectangular blocks respectively.

Figure 12:
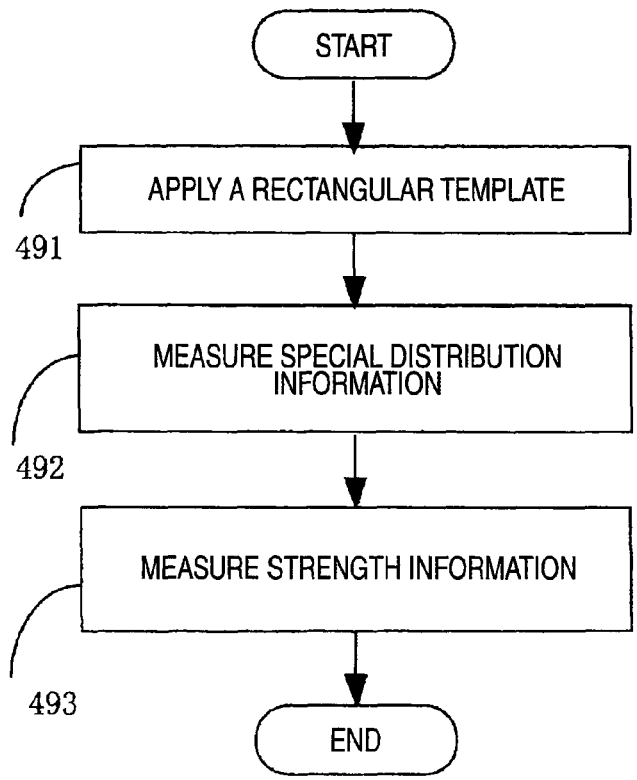
FIG. 12 A flowchart showing processing procedures of a feature extracting portion according to the embodiment of the present invention.
Figure 13:
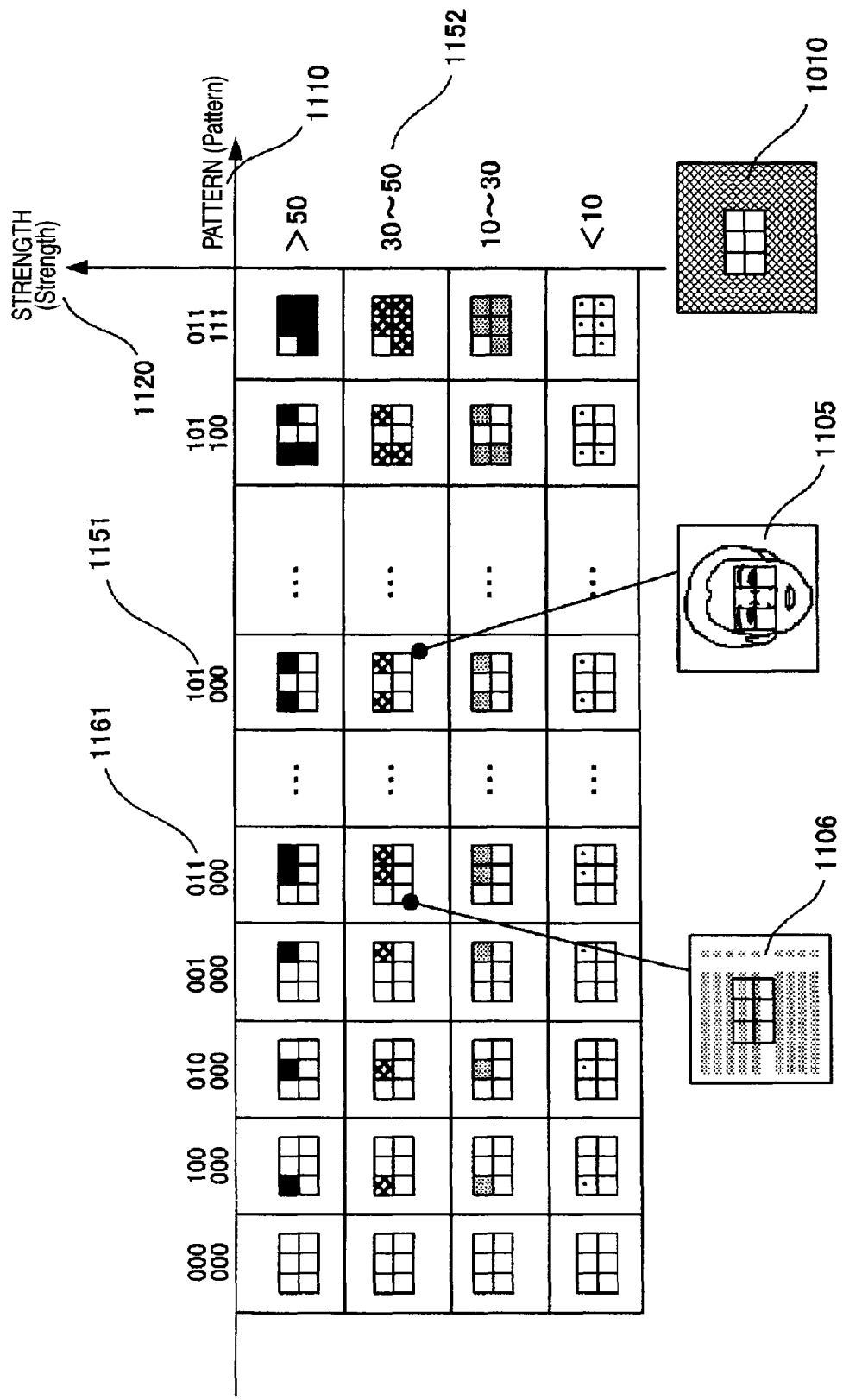
FIG. 13 An explanatory view explaining processing procedures in the feature extracting portion according to the embodiment of the present invention.
Figure 16:
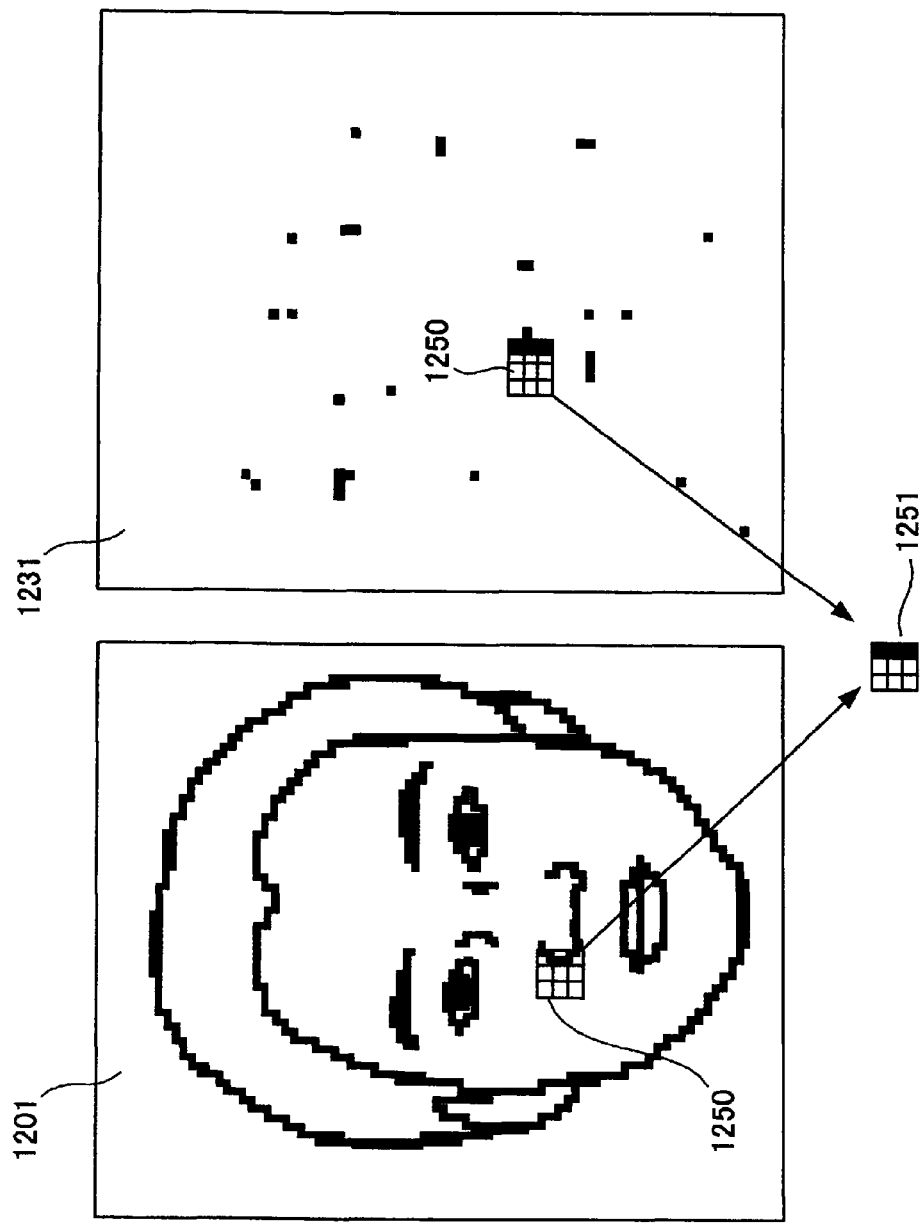
FIG. 16 A view explaining the problem of a feature quantity in the prior art.

FIG. 12 is a flowchart showing processing procedures of the feature extracting portion according to the embodiment of the present invention. Also, FIG. 13 is an explanatory view explaining processing procedures in the feature extracting portion according to the embodiment of the present invention.

In step 491, the feature extracting portion 390 applies a rectangular template f, which defines the rectangular block in the image window, to the image window X.

In step 492, the feature extracting portion 390 measures special distribution information from the image window. The special distribution information is given as a pattern 1110 indicating which rectangular block of the pattern has a higher brightness value than other blocks.

The pattern 1110 is calculated by comparing the brightness values of the rectangular blocks mutually. First, an average brightness value of all rectangular blocks is calculated, and this value is set as a reference brightness value. Then, average brightness values of individual rectangular blocks are calculated. The rectangular block is labeled "1" if the average brightness value of the rectangular block is smaller than the reference brightness value, while the rectangular block is labeled "0" if the average brightness value of the rectangular block is larger than the reference brightness value. These strengths can be calculated quickly and effectively by using the integral image. The pattern 1110 can be obtained by collecting the labels of the rectangular blocks.

By way of example, in FIG. 13, the rectangular template 1010 is used. The feature extracting portion 390 generates a pattern 1151 of "pattern=101000" with respect to an input face image 1105. The feature extracting portion 390 generates a pattern 1161 of "pattern=011000" with respect to an input non-face image 1106.

In step 493, the feature extracting portion 390 measures spatial brightness information from the image window. This spatial brightness information is referred to as a "strength" that indicates how strength differences are present in which windows among different blocks.

A strength 1120 is calculated by subtracting the average brightness value of all rectangular blocks labeled "1" from the average brightness value of all rectangular blocks labeled "0".

For example, in FIG. 13, the feature extracting portion 390 generates a strength 1152 of "strength=35" with respect to the input face image 1105. The feature extracting portion 390 generates a strength 1152 of "strength=37" with respect to another input non-face image 1106.

The feature f(X) that the feature extracting portion 390 extracts is a two-dimensional quantity, and can be represented by following Formula (14).

[Formula 14]

$$f(X)=(\text{pattern, strength}) \qquad (14)$$

The extracted feature quantity uses two attributes of the pattern and the strength to improve a feature quantity identifying power. In many cases, both the spatial distribution information and the brightness value information are needed to discriminate the image.

To take an example, in FIG. 13, the input face image 1105 and the input non-face image 1106 have a similar strength. Both images cannot be discriminated mutually by the prior art based on the strength information. However, since the face image 1105 and the non-face image 1106 have different pattern values, both images can be discriminated mutually based on the pattern value.

FIG. 14 is a view showing another example of the rectangular template for feature extraction according to the embodiment of the present invention. When the image window 1001 is given, the rectangular template contains L rectangular blocks in an inside of the window 1001.

Like a rectangular block 1091 shown in FIG. 4(A), the rectangular blocks may have a different size respectively. Also, like rectangular blocks 1092, 1093 shown in FIG. 14(B), FIG. 14(C), the rectangular blocks may not be intersected with each other or may not be adjacent to each other. Also, like rectangular blocks 1094, 1095 shown in FIG. 14(D), FIG. 14(E), the rectangular blocks may be overlapped completely or partially with each other.

According to the object detecting apparatus and the learning apparatus for the same of the embodiment of the present invention, following buildings are provided.

First, in the object detecting apparatus, the node has a plurality of identifiers that have been trained by the boosting learning method. The network learning process receives a number of image samples as the input, divides these image sample groups into some sets, and trains the identifiers based o respective image sets. In order to decide the identifiers to be arranged on the nodes, first the building collects the training samples reaching the nodes in the identifying process. Then, the building decides the area which has the highest identification error and in which many learning samples reside. Then, the weak classifier executes the identification in the limited area. The weak classifier never uniformly exerts the influence on the whole input space. Each weak classifier added newly is characterized, and makes only an improvement of the result of the preceding weak classifier in the decided area. In the network identifier of the embodiment of the present invention constructed in this manner, such advantages can be achieved that it is the partial space of the input image consisting of the image propagated through that path that the identifier in each path identifies, the separation is made easier in the face/non-face decision in the partial space rather than the decision in the whole input image space, and a large number of weak classifiers are not needed unlike the strong classifier at the later stage in the prior art. As a result, the first problem can be solved.

Also, in the node network of the embodiment of the present invention, (1) each node has the strong classifier for discriminating the face/the non-face based on the accumulated evaluation value of the nodes processed until the image sample arrives at its own node, and (2) the identifier at each node is caused to learn based on the learning sample arriving at that node and the result of the accumulated evaluation value at the preceding node. That is, according to the present system, there is employed the building that each node acts as the strong classifier consisting of the nodes that exist on the route followed until now and the process is continued at the subsequent child node that was learned in response to the decision result when the result is not enough to decide whether or not the object exists. Therefore, since the identified result obtained until now can be always utilized effectively, the identifying process can be realized optimally at a high speed. Also, the discriminator specialized in the partial area of the input space is selected for each node by the first solving means and, in the node joining as one of characteristic structures of the present node network (the presence of the child node having a plurality of parent nodes), the identifying process of a variety of partial areas of the input space can be executed by the joining structure that takes over the samples of all parent nodes and learns the optimum discriminator in the partial area in which the identification object areas of the parent nodes are joined. Accordingly, the image at a certain spot in the input space is processed by the weak classifiers at a plurality of nodes, and the decision making based on the accumulated values of these results can be realized. As a result, the second problem can be solved.

Also, in the system for detecting the object from the image, in the identifying process, the input data can be processed via a plurality of paths on the network. The term "path" is the route of the node used in processing/identifying the input data. The identifier of each node on the path contains not only the weak classifier that identifies the input image but also the identifier that accumulates the identified results of the weak classifiers of the nodes followed up to the preceding stage. Therefore, the identified result by the strong classifier or the identifier can be obtained by using the accumulated score from the weak classifiers of respective nodes on the path. Also, plural paths are further generated from the current paths during the identifying process. In order to prevent an increase of the unnecessary paths, the path having the highest identification error is terminated. Since the nodes are split and/or joined, the overall network can be regarded as the joint of a plurality of different strong classifiers that share the common weak classifiers. The strong identifier built up by using the nodes on plural paths is equivalent to that the parallel strong classifiers trained to operate in cooperation are worked. The identified result having the best identification error out of the identified results of the paths is selected as the output result. In this manner, the identifier that can cause respective paths to operate cooperatively in smaller computational complexity than the majority voting system, while keeping the identification power that is equal to or greater than that of the sensing system consisting of a plurality of cascade identifiers (=the cascade identifier in the majority voting system), can be accomplished. As a result, the third problem can be solved.

In the system for detecting the object from the image, the feature quantity extracting approach of the present embodiment measures both the spatial distribution information and the brightness value information of the input image window. First, the object area in the image window is decided in the feature template. First, as the attribute denoted as the "pattern", the value indicating that the brightness value of the area is higher or lower than those of other areas is calculated. This attribute represents the spatial magnitude distribution of the brightness value. Then, as the attribute denoted as the "strength", the value indicating a difference between the magnitudes of the brightness values in the image window is calculated. In short, the feature selecting approach proposed by the present embodiment employs two attribute values to extract useful information from the image. As a result, the fourth problem can be solved.

Also, in the object detecting apparatus and the learning apparatus for the same according to the embodiment of the present invention possess the features described as follows. The first feature is that the identifier is localized to carry out the identification in a partial space of the input image. Unlike the conventional approach in which the weak classifier is trained to identify the overall input space, the present embodiment trains the weak classifier to process the partial area of the input space by introducing the network structure. Namely, each identifier executes a particular identifying process in a particular area regardless of the identifying processes of other identifiers. As a result, an improvement of accuracy and a reduction of the identification error can be achieved and the more complicated nonlinear identifier can be built up.

Also, in the present embodiment, the identifier corresponding to the input image is applied, and thus there is no need to evaluate all identifiers. Therefore, a computational processing cost in the identifying process can be reduced. In addition, in order to ensure that the simple (easy-identify) input image can be identified in an early stage even when the input image contains the object or not, the weak classifiers positioned on the upper portion or the outer portion of the network, in which the input image is processed early, are specialized to process the simple input image.

The second feature is that the identified result is shared more effectively. In the present embodiment, the network structure is employed instead of the cascade structure in which the weak classifiers are connected in the conventional approach. The identifiers are arranged on the nodes on the network connected from a plurality of nodes to a plurality of nodes. The network splitting structure localizes the identifier to the operation in the particular area, and the joining structure ensures that the network is connected tightly mutually. In the building of the connection nodes, the over-fragmentation of the input space is prevented by integrating the learning samples of the parent nodes in use. The identification information can be shared effectively with the system of the present embodiment in which the object problem is solved by the splitting and the joining, and a total number of the identifiers used in the overall object detecting apparatus can be reduced.

The third feature is that plural identified results are generated from one identifier. In the system of the present embodiment, the object detecting apparatus selects a plurality of weak classifiers from the network of the identifiers and executes the identifying process of the input image via a plurality of routes. Respective paths are the set of the identifiers to identify the input image. The identifiers are selected dynamically to reduce the identification error in the identifying process. Upon selecting the path of the identifier reaching the node in a certain layer, a new path is generated by utilizing the old paths up to the preceding stage while carrying out the splitting and the joining of the nodes of the old paths. Each path outputs the strong decision result that decides whether or not the object is present in the input image. That is, actually the network itself is the set of the strong classifiers that share a plurality of weak classifiers. In contrast to the conventional majority voting system in which the individual strong classifiers are used, a plurality of strong classifiers of the present embodiment are trained collectively and operated in a highlighted fashion. Further, an increase of the processing load caused in operating a plurality of discriminators in parallel in the conventional majority voting system can be suppressed by terminating the path having the highest identification error.

The fourth feature is that a new feature extracting approach having a higher identification power is employed. In the present embodiment, the rectangular pattern feature that makes it possible to measure both the spatial pattern information and the brightness intensity information in a certain area in the input image window is proposed, in contrast to Non-Patent Literature 1 and Patent Literature 1 in the prior art in which the rectangular feature quantity is used to measure the strength information of the certain area. The spatial pattern information indicates how the pixels having different magnitudes of the brightness are arranged in the certain area. The strength information indicates how strong the difference of the brightness values is between the pixel areas having different magnitudes of the brightness. Because the strength information is incorporated, the rectangular pattern feature of the present embodiment is robust against the noise image rather than the approach in Non-Patent Literature 4. Also, the pattern feature of the present embodiment can extract the broader feature than the approach that compares the pixels mutually in Non-Patent Literature 4. As a result, an identifying power can be increased higher, and also the number of feature quantities required to find the objective substance can be reduced when this approach is applied to the detecting system.

The present invention is explained in detail with reference to particular embodiments as above. But it is apparent for those skilled in the art that various variation and modifications can be applied without departing from a spirit and a scope of the present invention.

This application is based upon Japanese Patent Application (Patent Application No. 2005-175356) filed on Jun. 15, 2005; the contents of which are incorporated herein by reference.

INDUSTRIAL APPLICABILITY

The object detecting apparatus and the learning apparatus for the same of the present invention possess such advantage that an increase of processing loads can be suppressed with high accuracy, and are useful in detecting the object taken by a surveillance camera, or the like, and others.

The invention claimed is:

1. An object detecting apparatus, comprising:
 a setting portion which sets a rectangular template defined by a plurality of rectangular blocks with respect to an image;
 a first calculation portion which calculates a reference brightness value based on brightness values of the rectangular blocks contained in the rectangular template, and each individual brightness value of the respective rectangular blocks;
 a second calculation portion which calculates spatial distribution information on the basis of magnitude relation between the reference brightness value and the each individual brightness value of the respective rectangular blocks; and
 a determination portion which determines whether the image inside the rectangular template contains an object with reference to the spatial distribution information.

2. The object detecting apparatus according to claim 1, wherein the plurality of rectangular blocks differ in size from one another.

3. The object detecting apparatus according to claim 1, comprising a labeling portion which labels, when the individual brightness value of the respective rectangular blocks is equal to or larger than the reference brightness value, the corresponding rectangular block as a first label, and labels, when the individual brightness value of the respective rectangular blocks is smaller than the reference brightness value, the corresponding rectangular block as a second label, wherein
 the spatial distribution information is constituted by a group of the first label and the second label which the respective rectangular blocks are labeled.

4. The object detecting apparatus according to claim 3, wherein a strength is calculated on the basis of a difference between an average brightness value of the individual brightness values of all rectangular blocks which are labeled as the first label and an average brightness value of the individual brightness values of all rectangular blocks which are labeled as the second label, and
 the determination portion determines whether the image to which the rectangular template is set contains an object with reference to the spatial distribution information and the strength.

5. The object detecting apparatus according to claim 1, wherein the plurality of rectangular blocks are separate away from one another.

6. The object detecting apparatus according to claim 1, wherein the plurality of rectangular blocks overlap one another.

7. An object detecting method, comprising:
 setting a rectangular template defined by a plurality of rectangular blocks with respect to an image;
 calculating a reference brightness value based on brightness values of the rectangular blocks contained in the rectangular template;
 calculating each individual brightness value of the respective rectangular blocks;
 calculating spatial distribution information on the basis of magnitude relation between the reference brightness value and the each individual brightness value of the respective rectangular blocks; and
 determining whether the image inside the rectangular template contains an object with reference to the spatial distribution information.

* * * * *